United States Patent [19]
Petersen et al.

[11] Patent Number: 5,434,872
[45] Date of Patent: Jul. 18, 1995

[54] APPARATUS FOR AUTOMATIC INITIATION OF DATA TRANSMISSION

[75] Inventors: Brian Petersen, Los Altos; David R. Brown, San Jose; W. Paul Sherer, Sunnyvale, all of Calif.

[73] Assignee: 3Com Corporation, Santa Clara, Calif.

[21] Appl. No.: 920,893

[22] Filed: Jul. 28, 1992

[51] Int. Cl.⁶ .................. H04L 12/413; H04L 25/36; G06F 13/00
[52] U.S. Cl. .................. 371/57.1; 364/DIG. 1; 364/239.51; 370/85.3; 395/200; 395/250
[58] Field of Search .............. 371/57.1; 395/250, 200; 364/239.51; 370/85.1, 85.15, 85.3

[56] References Cited

U.S. PATENT DOCUMENTS

| | | | |
|---|---|---|---|
| 4,258,418 | 3/1981 | Heath | 395/250 |
| 4,715,030 | 12/1987 | Koch et al. | 370/85.13 |
| 4,860,193 | 8/1989 | Bentley et al. | 395/250 |
| 5,043,981 | 8/1991 | Firoozmand et al. | 370/85.1 |
| 5,195,093 | 3/1993 | Tarrab et al. | 371/3 |
| 5,210,749 | 5/1993 | Firoozmand | 370/85.1 |
| 5,278,956 | 1/1994 | Thomsen et al. | 395/250 |

*Primary Examiner*—Stephen M. Baker
*Attorney, Agent, or Firm*—Haynes & Davis

[57] ABSTRACT

Early initiation of transmission of data in a network interface that includes a dedicated transmit buffer is provided in a system which includes logic for transferring frames of data composed by the host computer into the transmit buffer. The amount of data of a frame which is downloaded by the host to the transmit buffer is monitored to make a threshold determination of an amount of data of the frame resident in the transmit data buffer. The network interface controller includes logic for initiating transmission of the frame when the threshold determination indicates that a sufficient portion of the frame is resident in the transmit buffer, and prior to transfer of all of the data of the frame into the transmit buffer. The monitoring logic includes a threshold store, which is programmable by the host computer for storing a threshold value. Thus, the threshold value may be set by the host system to optimize performance in a given setting.

26 Claims, 13 Drawing Sheets

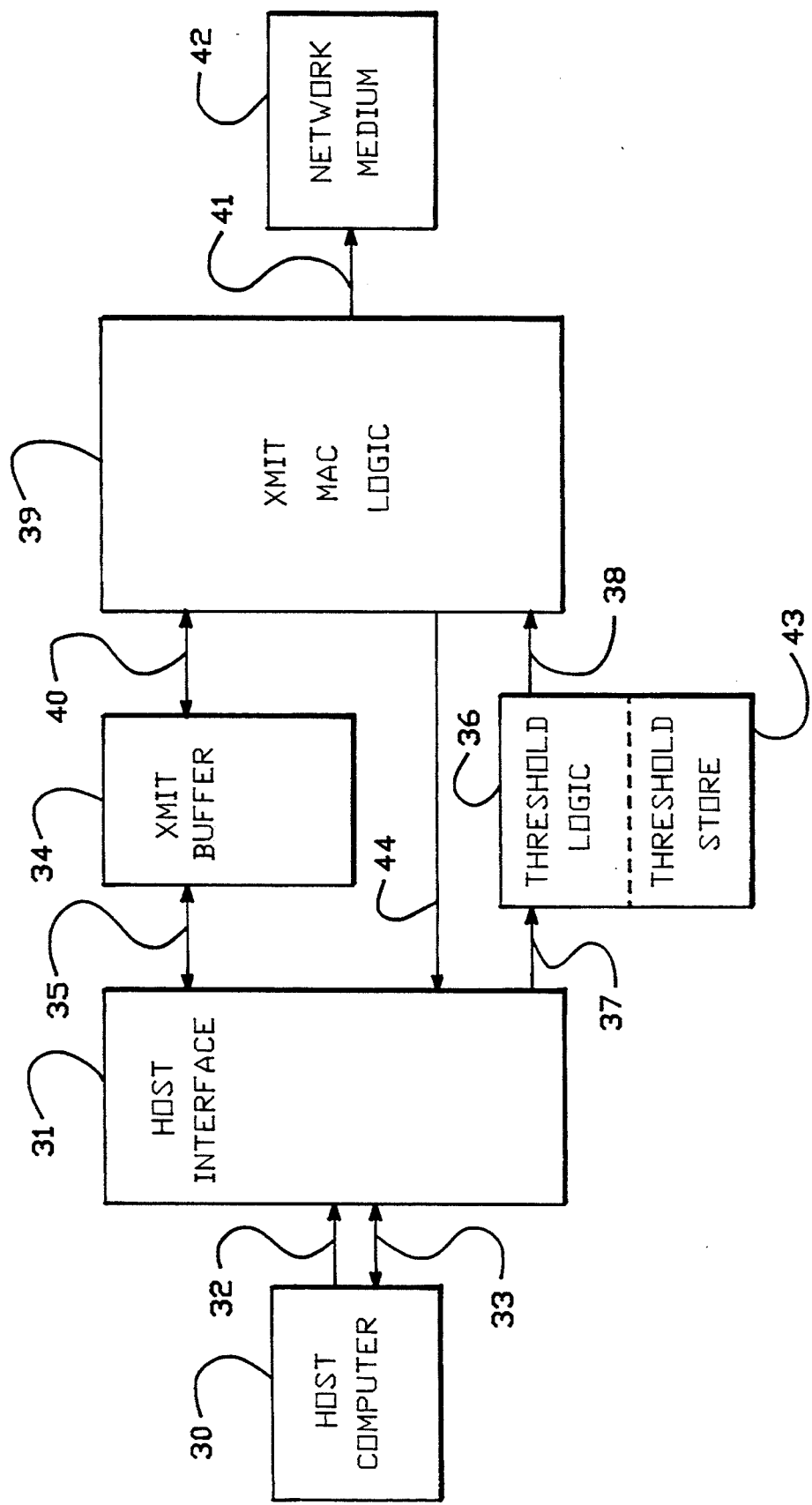
FIG. —2

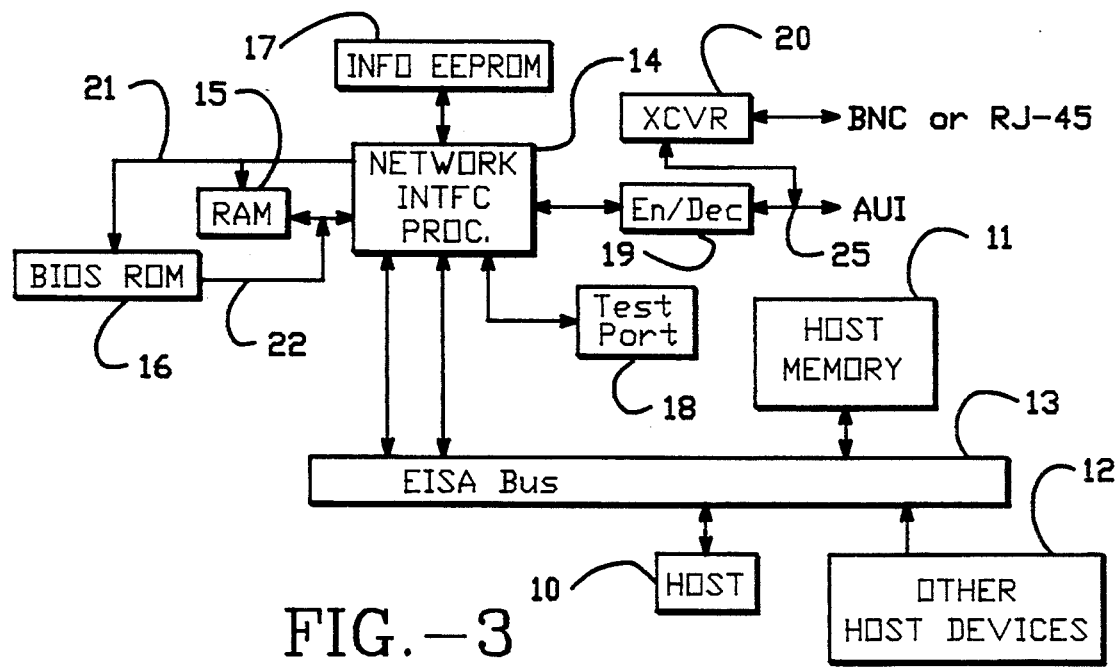
FIG.—3
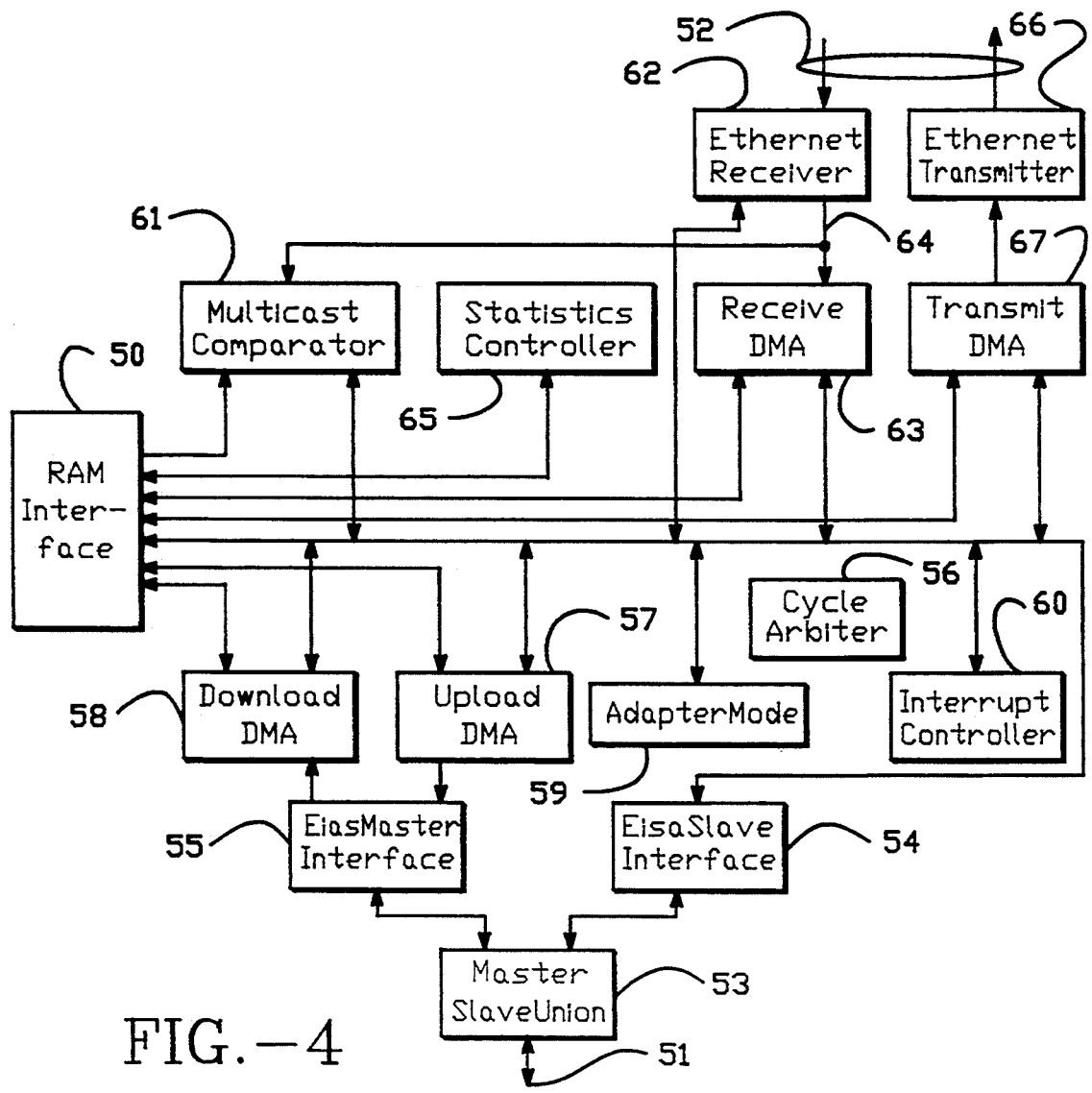
FIG.—4

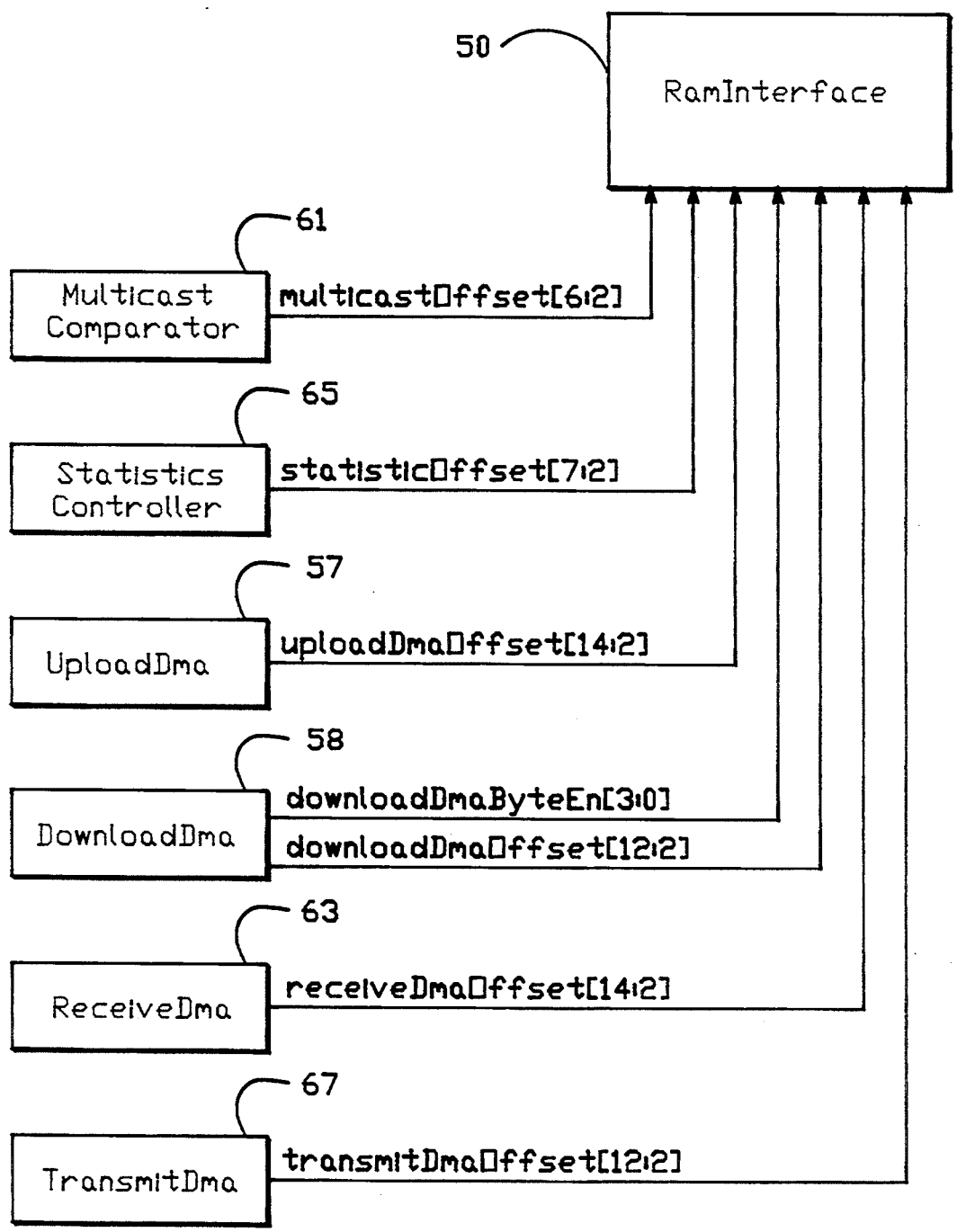
Autonomous Access Address Bus Structure
FIG.—4A

| base address | | size |
|---|---|---|
| 0x0 | Transmit Data Buffer | 3K |
| 0xc00 | Transmit Descriptors | 5K |
| 0x2000 | Receive Buffer | 22K |
| 0x7800 | Transfer Descriptor | 1K |
| 0x7c00 | AdapterInfo Data | 256 |
| 0x7d00 | Network Statistics | 196 |
| 0x7e00 | Muticast Address Table | 96 |

Adapter RAM Memory Map

FIG.—7

| 31 | 16 | 15 | 0 | Offset |
|---|---|---|---|---|
| NextDescriptorPointer | | | | 0x0 |
| XmitFailure | | | | 0x4 |
| FrameLength | | | | 0x8 |
| XmitReqHandle | | XmitStatus | | 0xc |
| XmitProtId | | MACID | | 0x10 |
| XmitBufferCount | | XmitImmedLen | | 0x14 |
| Immediate Data | | | | 0x18 |
| XmitDataLen | | 0 | | |
| XmitDataPtr | | | | | repeated XmitBufferCount times

FIG.—8

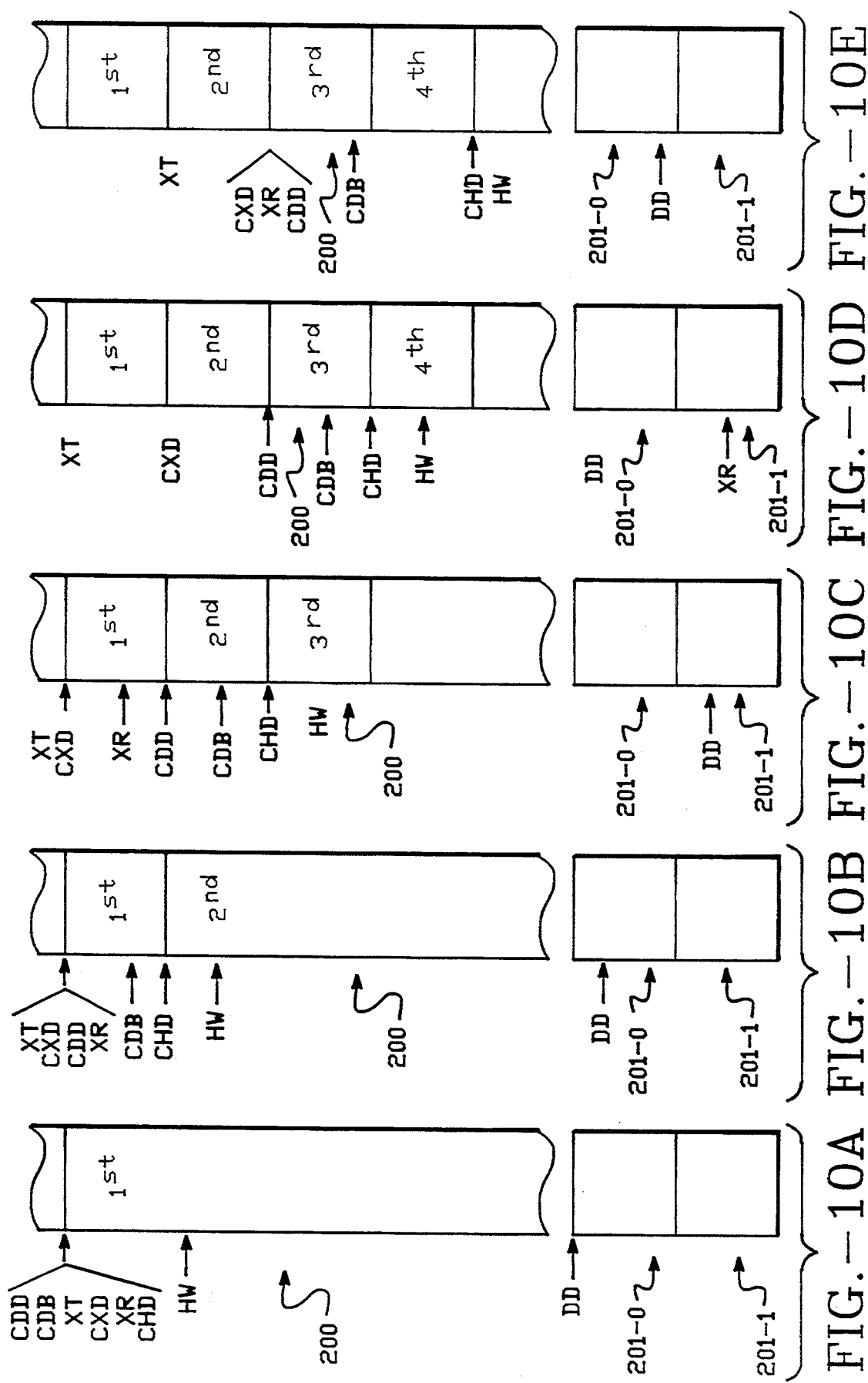

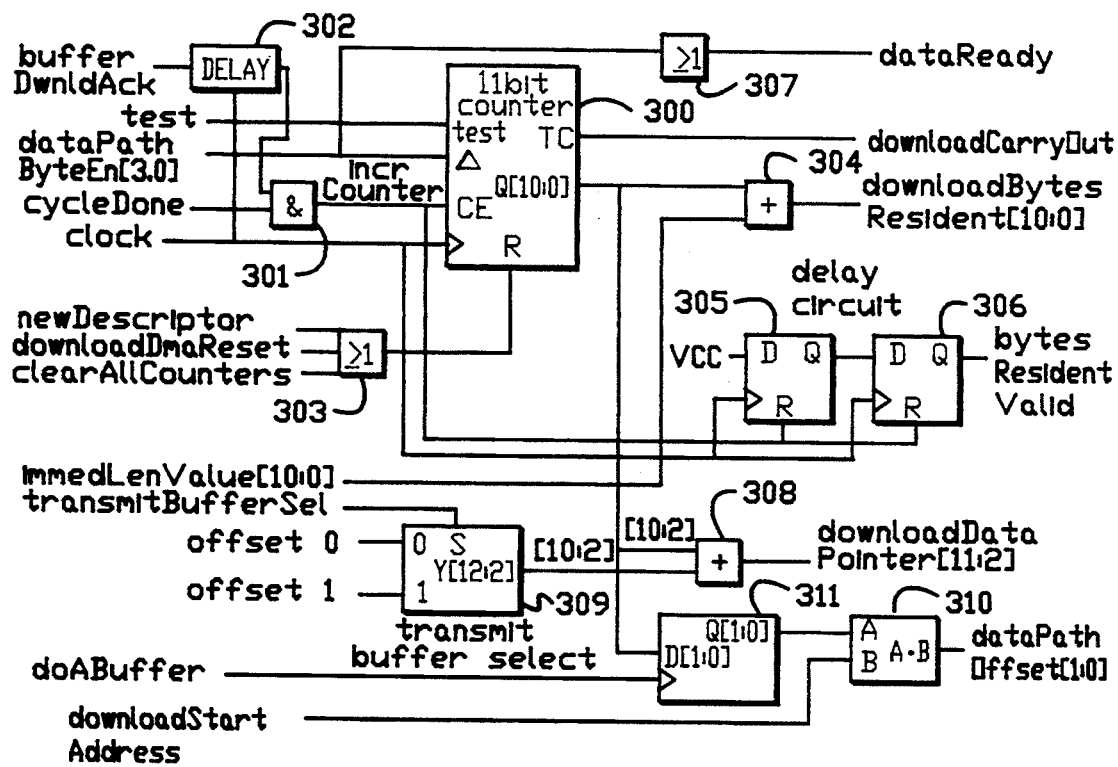
FIG.—11
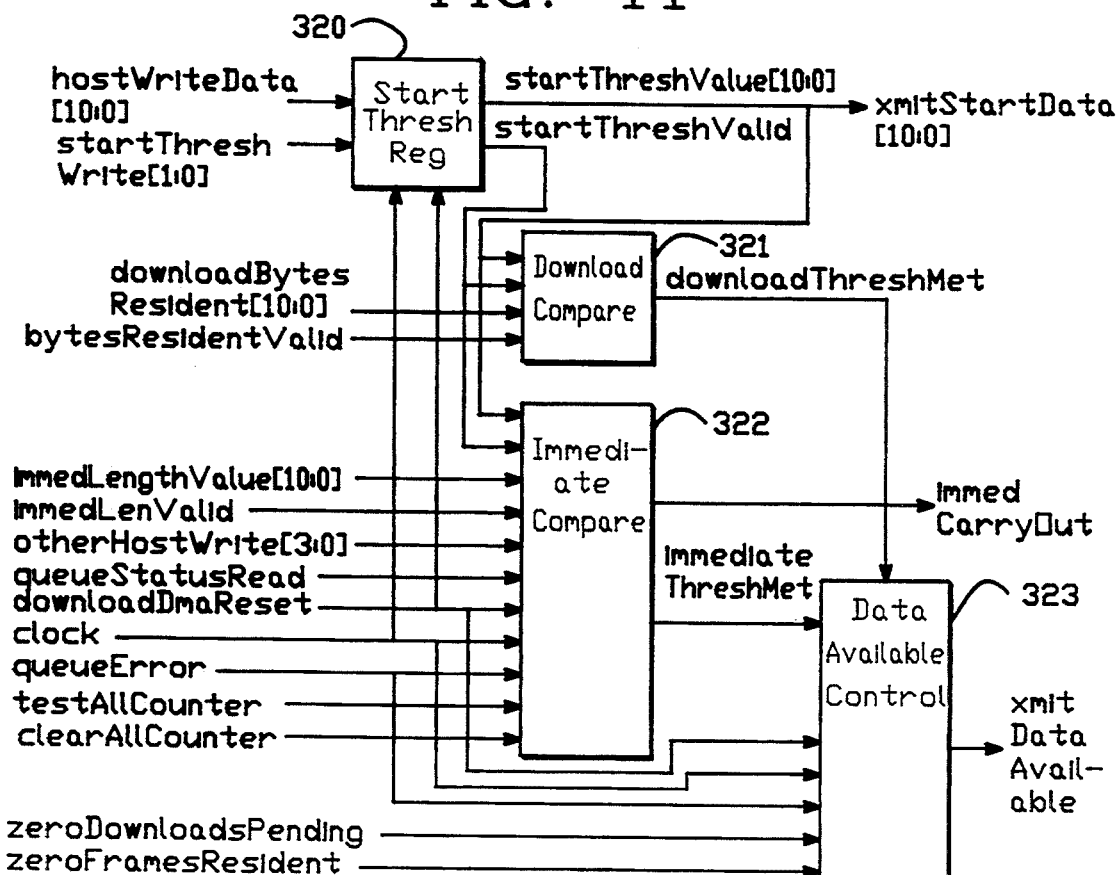
FIG.—12

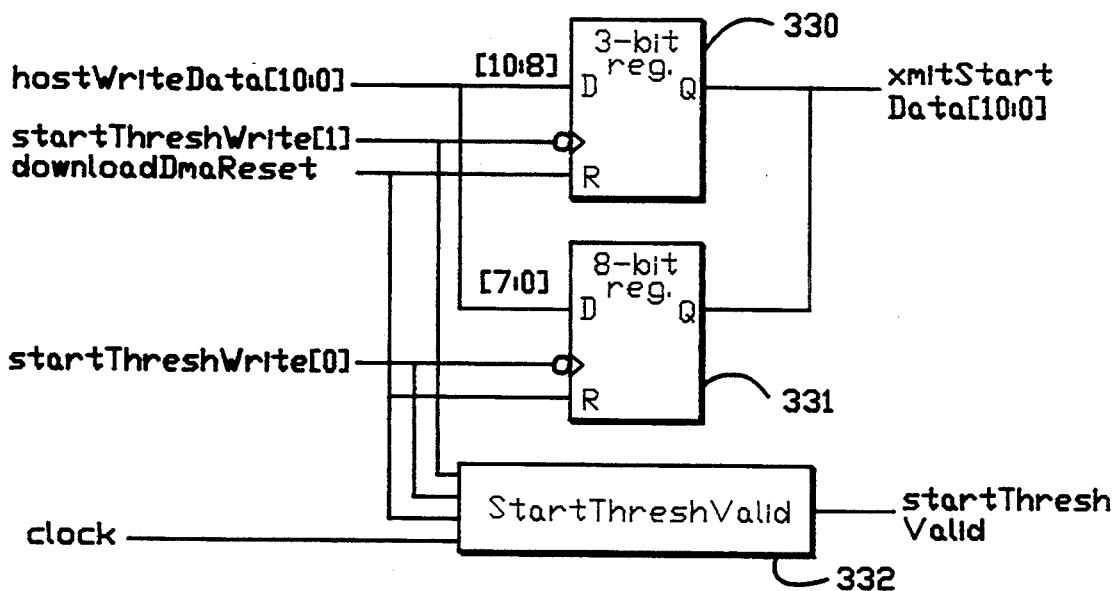
FIG.—13
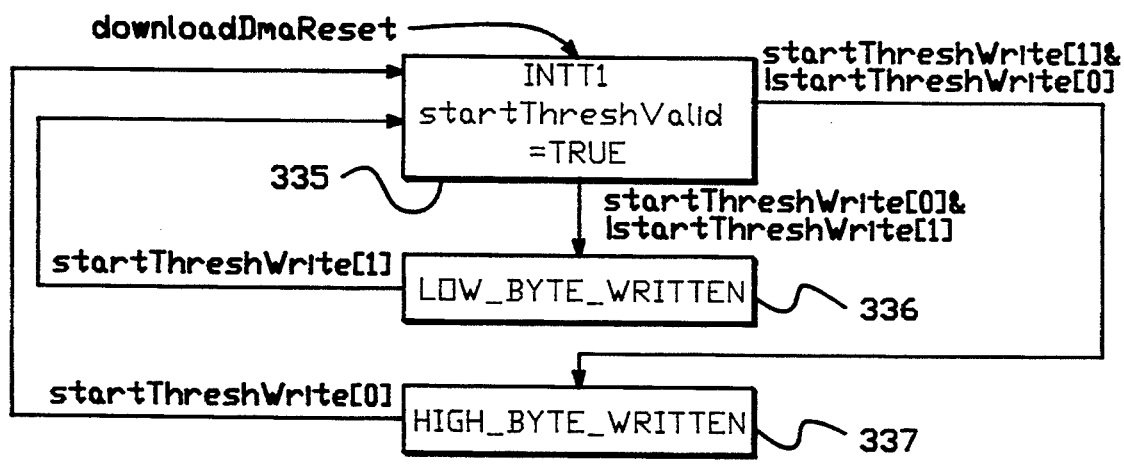
Start Thresh Valid State Diagram
FIG.—14
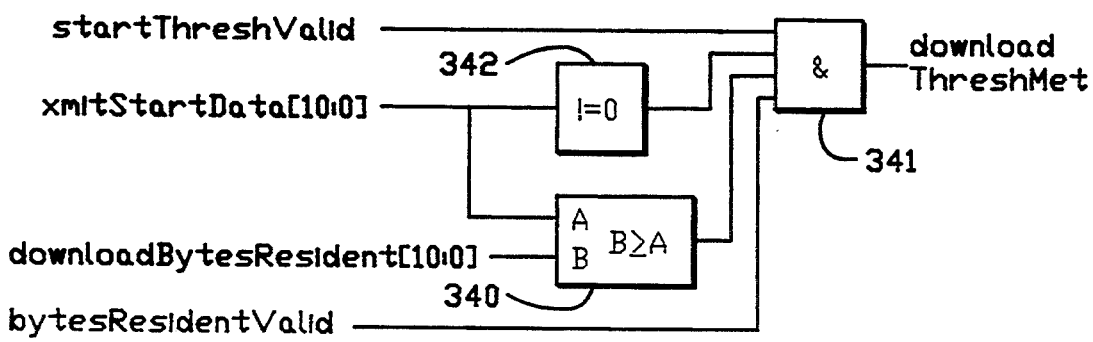
FIG.—15

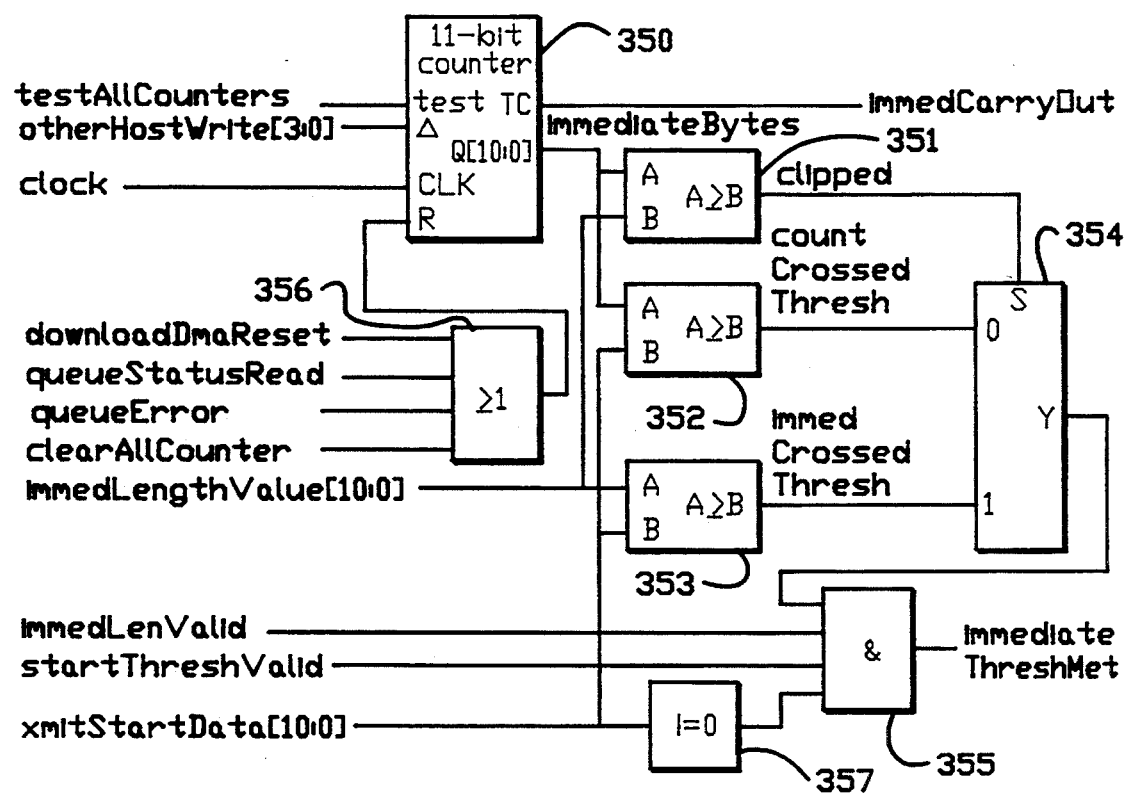
FIG.—16
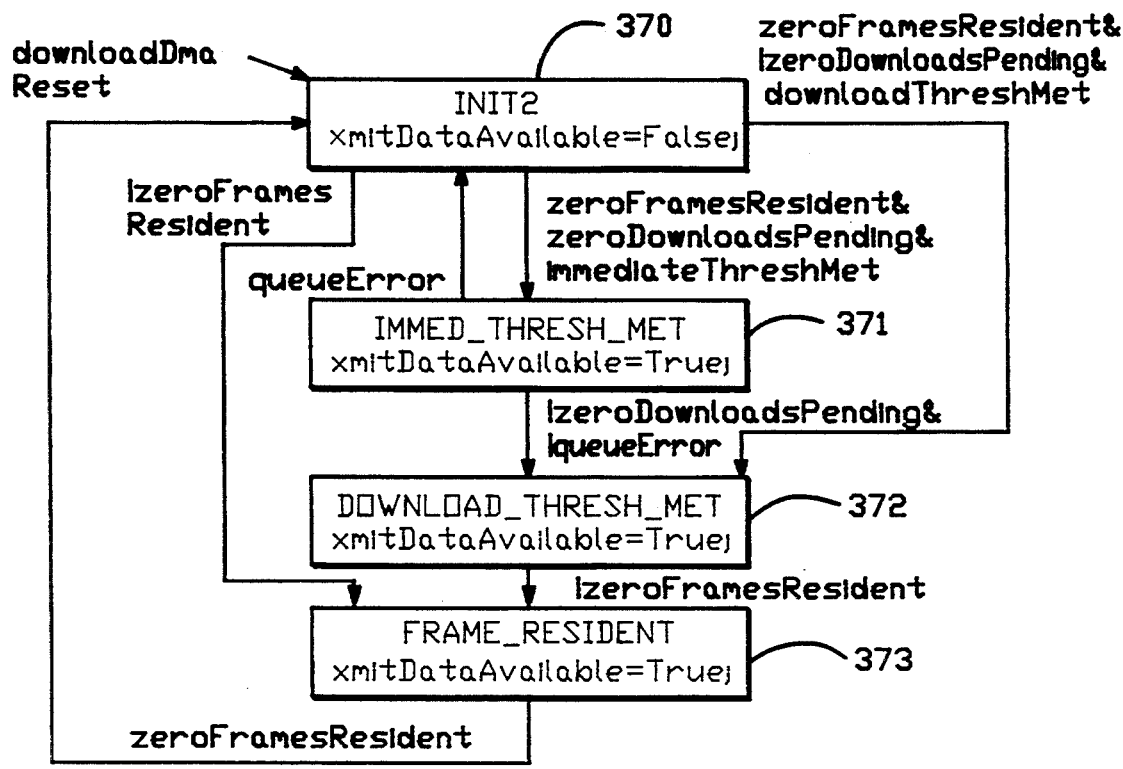
DataAvailableControlStateDiagram
FIG.—17

APPARATUS FOR AUTOMATIC INITIATION OF DATA TRANSMISSION

CROSS-REFERENCE TO RELATED APPLICATIONS

The present application is related to copending U.S. patent application entitled NETWORK INTERFACE WITH HOST INDEPENDENT BUFFER MANAGEMENT, application Ser. No. 07/921,519, filed 28 Jul. 1992, now U.S. Pat. No. 5,299,313, which was owned at the time of invention and is currently owned by the same assignee.

FIELD OF THE INVENTION

The present invention relates to interfaces between communications networks and data processing systems; in particular, systems which involve the transmission of packets or frames of data across a communications network.

DESCRIPTION OF RELATED ART

Data communication systems are often based on the transmission of packets or frames of data that are composed by a sender. The packets or frames of data are designed to be compatible with the network protocol involved with the communication system. Thus, the sending system must compose the frames of data according to the network protocol prior to initiation of transmission of data. Often, a sending system will wait for acknowledgement that a frame of data sent to a network adapter has been transmitted prior to performing a subsequent task, such as composing a second frame of data to be transmitted.

Some network adapter interfaces include dedicated transmit buffers into which a frame of data composed by the sending system can be downloaded by the sending system. The frame is then stored in the transmit data buffer until the media access control functions associated with transmitting the frame on the network have successfully transmitted the frame, or cancelled the frame transmission. If the frame transmission is cancelled, the data may be retained in the transmit data buffer until the sending system initiates a second attempt to transmit the frame. Transmit data buffers are to be distinguished from first-in-first-out FIFO systems, in which the sending system downloads data of a frame into the FIFO, while the network adapter unloads the FIFO during a transmission. The data in FIFOs cannot be retained and reused by the media access control functions, or by the host, like data in transmit data buffers.

Although transmit data buffers enable a sending system to compose and download a frame into the transmit data buffer, and then attend to other tasks while the network adapter attempts to transmit the frame, it suffers the disadvantage that transmission of a frame is delayed until the entire frame has been downloaded into the buffer. Thus, transmit data buffer type systems improve host system efficiency at the expense of network throughput. Operations which are communication intensive suffer a performance downgrade.

Furthermore, the prior art systems which use transmit data buffers require the host or sending system to manage the transmit data buffer. A network interface controller transfers data from the host managed transmit data buffer using DMA techniques through a FIFO buffer in the interface controller and on to the network.

Representative prior art systems include the National Semiconductor DP83932B, a systems-oriented network interface controller (SONIC) and the Intel 82586 local area network coprocessor.

It is desirable to provide the advantages of a transmit data buffer, while maintaining the communications throughput available from the simpler FIFO based systems.

SUMMARY OF THE INVENTION

The present invention provides for the early initiation of transmission of data in a network interface that includes a dedicated transmit buffer. The system includes logic for transferring frames of data composed by the host computer into the transmit buffer. Also, the amount of data of a frame which is downloaded by the host to the transmit buffer is monitored to make a threshold determination of an amount of data of the frame resident in the transmit buffer. The network interface controller includes logic for initiating transmission of the frame when the threshold determination indicates that a sufficient portion of the frame is resident in the transmit buffer, and prior to the transfer of all of the data of the frame into the transmit buffer. In one aspect of the invention, the monitoring logic includes a threshold store, which is programmable by the host computer for storing a threshold value and logic for posting status information to the host. Thus, the threshold value may be set by the host system to optimize performance using the alterable threshold store and the posted status information.

According to another aspect of the present invention, the transmit buffer includes a transmit descriptor ring, and a transmit data buffer. The host system composes a frame by storing a transmit descriptor in the adapter managed transmit descriptor ring. The transmit descriptor may remain resident in the transmit descriptor ring for some time prior to an initiation of the transmission of the data by the adapter, because of other transmit descriptors being processed ahead of a current descriptor, or other reasons. When the adapter begins processing of a transmit descriptor, it retrieves immediate data from the descriptor itself, and begins a download process into the transmit data buffer of data identified in the descriptor. The threshold logic determines the amount of immediate data from the descriptor, and monitors the downloading of data of the frame into the download area. When the combination meets the threshold, then actual transmission of the frame is initiated. Thus, transmission of a frame may be initiated before the complete frame has been downloaded into the download area.

Accordingly, the present invention provides an architecture for a network interface controller which greatly increases the flexibility for host systems in composing and transmitting frames of data, while maintaining communications throughput for applications that are communications intensive.

Other aspects and advantages of the present invention can be seen upon review of the figures, the detailed description, and the claims which follow.

BRIEF DESCRIPTION OF THE FIGURES

FIG. 2 is a schematic functional block diagram of the early transmit system according to the present invention.

FIG. 3 is a block diagram of a preferred implementation of the host system and network interface according to the present invention.

FIGS. 4 and 4A are diagrams of the network interface processor of FIG. 3 implementing the present invention, and of the structure of the autonomous access address buses, respectively.

FIG. 7 is a memory map of the adapter memory independent of the host system address space.

FIG. 8 illustrates the transcript descriptor data structure according to one aspect of the present invention.

FIGS. 10A–10E are a schematic illustration of the management of the pointers for the transmit descriptor ring buffer and transmit data buffer.

FIG. 11 is a logic diagram illustrating the data path arithmetic used in the transmit function for the network interface controller of FIG. 4.

FIG. 12 is a logic diagram of the transmit start control logic for the network interface adapter of FIG. 4.

FIG. 13 is a logic diagram of the transmit start threshold register for the logic of FIG. 12.

FIG. 14 is a state diagram for the transmit start threshold register of FIG. 13.

FIG. 15 is a logic diagram of the download compare logic of FIG. 12.

FIG. 16 is a logic diagram of the immediate data comparator of FIG. 12.

FIG. 17 is a state diagram for the data available control function in the logic of 12.

DESCRIPTION OF THE PREFERRED EMBODIMENTS

Figure 1:
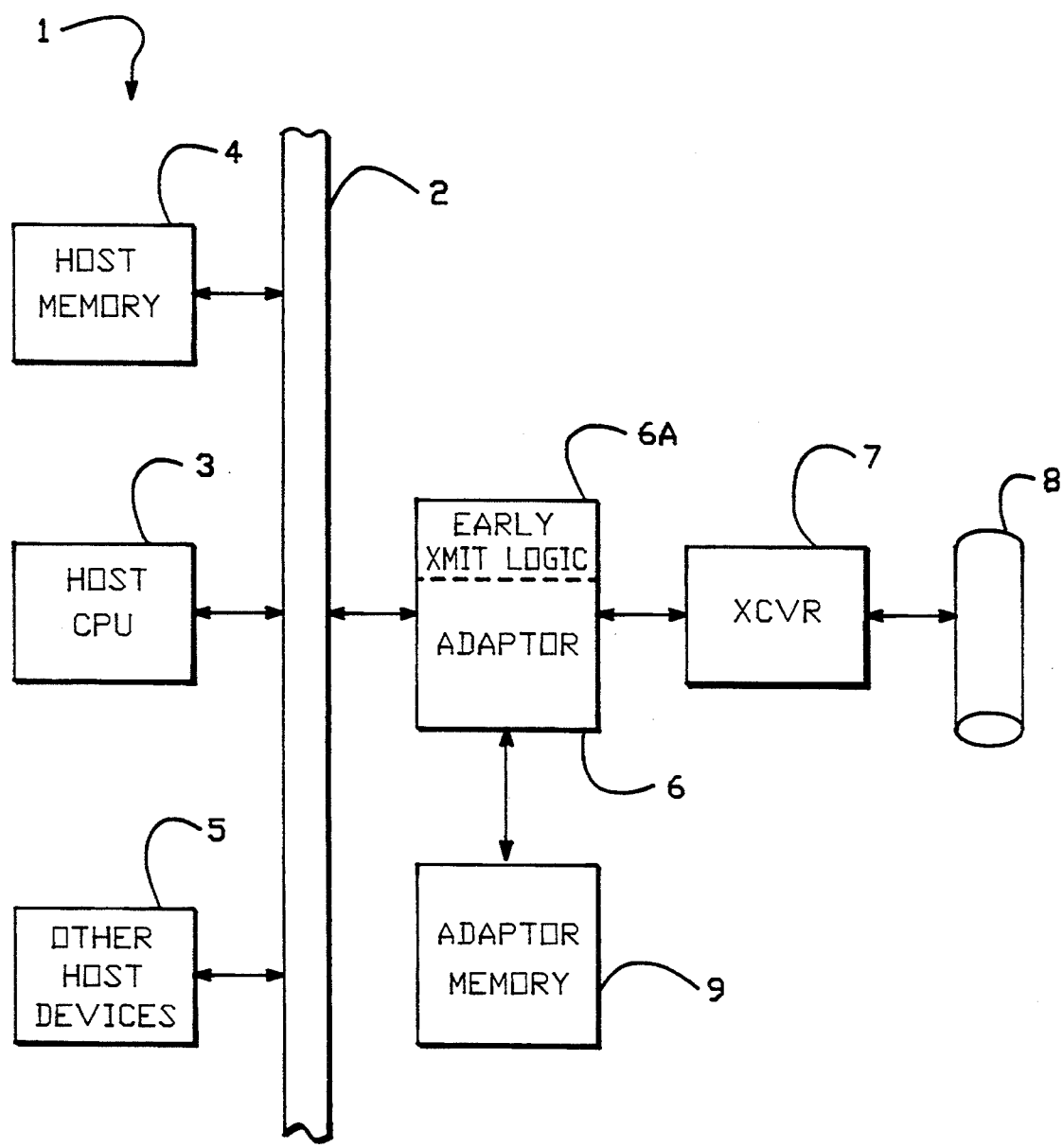
FIG. 1 is a simplified block diagram of a system with a network interface according to the present invention.

A detailed description of preferred embodiments of the present invention is provided with respect to the figures. FIGS. 1 and 2 provide an overview of the data communications systems according to the present invention. FIGS. 3 through 10A–10E provide a detailed description of a preferred implementation of the present invention, including data structures and data flow. FIGS. 11–18 provide one implementation of logic for implementing the early transmission feature of the present invention.

I. System Overview

FIG. 1 illustrates a data communication system according to the present invention with a controller circuit using a dedicated transmit buffer memory which is automatically enabled to begin transmission of a frame on the network when the number of bytes available in the transmit buffer memory exceeds a preprogrammed threshold. As shown in FIG. 1, such system for communicating data includes a host data processing system, generally referred to by reference number 1, which includes a host system bus 2, a host central processing unit 3, host memory 4, and other host devices 5, all communicating across the bus 2. A network interface adapter 6 is coupled to the host bus 2. The adapter 6 is coupled to a transceiver 7 which is, in turn, connected to a network medium 8, such as coaxial cable, a twisted pair conductor, a fiber optic, satellite, wireless, or other communication medium. The network adapter 6 is, in turn, connected to an adapter memory 9, which is managed by the interface controller 6 or by the host CPU 3, depending on a particular implementation provided. The adapter 6 also includes early transmit logic 6A for monitoring the transfer of data from the host system 1 into the adapter memory 9. The early transmit logic 6A makes a threshold determination for a given frame being transferred from the host 1 into the adapter memory 9. When the threshold is met, then the adapter 6 begins transmitting the frame across the network. Of course, a wide variety of other configurations of these components could be implemented. For instance, the adapter memory 9 may be connected directly to the host bus 2. Also, multiple bus configurations might be utilized.

FIG. 2 illustrates the functional components of the early transmit system according to the present invention. In FIG. 2, a number of functional blocks are represented. The host computer or sending system 30 communicates with a host interface logic 31, receiving data as indicated by line 32 and control signals as indicated by line 33. The host interface logic 31 supplies data to a transmit buffer 34 across line 35. Also, threshold logic 36 is coupled with the host interface logic 31 to monitor the transfer of data from the host computer 30 into the frame buffer 34. The line 37 indicates the coupling of the threshold logic 36 to the host interface logic 31. The threshold logic makes the threshold determination and generates a signal as indicated by line 38 to transmit logic 39 including, for instance, media access control MAC logic. The transmit logic 39 receives data from the buffer 34 across lines 40 and supplies that data as indicated by line 41 to the network medium 42. Coupled with the threshold logic 36 is a threshold store 43 which stores a threshold value which indicates an amount of data of a frame that must be resident in the frame buffer 34 before transmission of that frame may be initiated by the transmit DMA logic and MAC 39.

The threshold store 43, in a preferred system, is dynamically programmable by the host computer 30. In this embodiment, the threshold store 43 is a register accessible by the host through the interface logic 31. Alternatively, the threshold store may be a read only memory set during manufacture. In yet other alternatives, the threshold store may be implemented using user specified data in non-volatile memory, such as EEPROMs, FLASH EPROMs, or other memory storage devices.

The transmit logic 39 also supplies status information across line 44 to the host interface logic 31, for posting to the host system. The status information includes indications of underrun conditions and may be used by the host to optimize the value in the threshold store 43.

In operation, the host computer composes a frame of data to be transmitted on the network medium 42. The host computer 30 then identifies that frame through the host interface 31. The host interface coupled with the identifiers of the frame move data from the host computer 30 into the buffer 34 according to the description of the frame. The threshold logic 36 monitors the transfer of data into the buffer 34. When the threshold amount of data is resident in the buffer 34, then the transmit logic 39 is instructed to begin transmission of the frame. The transmit logic 39 then begins retrieving data from the buffer 34 to support transmission of the frame on the medium 42. This operation begins before the entire frame has been transferred from the host computer 30 into the buffer 34, if the transmit logic 39 is available to transmit the frame subject of the ongoing download from the host computer 30, the frame being downloaded into the buffer 34 is larger than the threshold set by the threshold store 43, and the host computer 30 indicates that immediate transmission of the data is desired.

As mentioned above, the buffer 34 may be directly addressable by the host computer 30, or in preferred systems is addressable through the host interface 31 which consists of a prespecified area of host address space into which the host computer 30 writes data and control signals associated with a transmission operation. The host interface 31 then maps the transfer of data from that prespecified address space into the buffer 34 and host accessible registers independent of the host.

A more detailed description of a preferred embodiment of the present invention is illustrated in FIG. 3.

II. System Overview

FIG. 3 is a schematic diagram of a computer system including the network interface controller according to the present invention. The computer system includes a host system, including a host processor 10, host memory 11, and other host devices 12, all communicating through a host system bus 13, such as an EISA bus. The host system bus 13 includes address lines which define a host system address space. Typically, for an EISA bus, there are 32 address lines establishing a host system address space of about 4 Gigabytes.

The network interface controller includes a network interface processor 14, implemented in one preferred system as an application specific integrated circuit designed to implement the functions outlined below using VERILOG design tools as known in the art (available from Cadence, Inc., San Jose, Calif.). The network interface processor 14 is coupled through appropriate buffers to the bus 13. The network interface processor 14 is also coupled to random access memory 15, BIOS ROM 16, and INFO EEPROM 17, a test port 18, an encode/decode chip 19, and a network transceiver 20. The network transceiver 20 is, in turn, coupled to a network medium.

A majority of the functionality is embodied in the network interface processor 14. In the preferred embodiment, all registers that are accessible across the bus 13 by the host system reside either in the processor 14, or in the RAM 15. If resident in the RAM 15, their access is managed by the network interface processor 14.

The RAM 15 is a primary resource on the network interface controller. This resource provides buffer memory outside the host address space used in the transmit and receive operations of the network interface. Details concerning the organization and utilization of this RAM 15 are described below.

The BIOS ROM 16 provides extension to the host system's basic input/output code through the network interface processor 14 during initialization. The addresses for the BIOS ROM 16 and the data from the BIOS ROM 16 are coupled to the network interface processor 14 across buses 21 and 22, respectively, which are also shared by the RAM 15.

The INFO EEPROM 17 stores critical adapter specific data used by drivers, diagnostics, and network management software. This data is stored during the manufacturing process. During initialization of the interface controller, the contents of the EEPROM 17 are loaded into a prespecified area of the RAM 15 for use during operation.

Coupled to the interface processor 16 is an encode/decode chip 19, such as the National Semiconductor 8391 Manchester encode/decode chip. The signals coupled to the AUI connector are provided to allow use of a transceiver external to the board.

The transceiver 20 in a preferred system comprises either a thin Ethernet (coax/BNC) transceiver or a 10BaseT (Type 3/RJ-45) transceiver. Control signals for the transceiver 20 are produced on the network interface controller 14, using the conversion logic on the encode/decode chip 19.

A test port 18 is provided in a preferred system for use during manufacture and testing.

III. Controller Functional Units

FIG. 4 provides a block diagram of the network interface processor 14 of FIG. 3, including functional blocks and data paths. There are numerous connections not shown having to do with the control of the various data flow paths. The interfaces illustrated include a RAM interface 50, a host bus interface 51, and a transceiver interface 52. The bus interface 51 is implemented for an EISA bus, and operates at times either as a master or as a slave on the bus. Each of the functional units in the implementation shown in FIG. 4 is described below.

A. EISA Slave Interface 54

The EISA slave interface 54 provides a path for the EISA host to access the registers and buffers managed by the network interface controller. The module contains configuration registers for the controller, and performs crude decoding of the EISA bus for the purpose of routing signals. The EISA slave interface 54 does not interpret any of the addressing of individual registers distributed throughout the controller.

In operation, the EISA slave interface continuously monitors the EISA address bus and determines when the configuration registers, memory mapped network registers, or BIOS ROM of the adapter are being accessed.

In addition, for every memory slave cycle initiated by the EISA bus, the EISA slave interface will post a cycle request to the cycle arbiter 56. The cycle arbiter imposes wait states upon the host system until the request has been granted.

The EISA slave interface also provides a generic 32 bit bus interface to the remainder of the network controller. The generic nature of the interface allows for easy adaptation of the design to other bus types, such as the microchannel, without requiring redesign of the remainder of the chip.

Bits 14–2 of the EISA address bus are latched and pass through to other modules. The least significant two bits (1, 0) of the address are represented by 4 byte enables that are also valid throughout a data transfer cycle. Four 8-bit byte lanes make up the slave data channel. The data bus is actually a pair of unidirectional buses, one for writes and one for reads in a preferred system. The data write bus is wired in a multi-drop fashion to all modules that require connection to the EISA data bus through the slave interface. The read bus is multiplexed and masked in the RAM interface module 50. Write requests by the EISA bus can be held until they are acknowledged by the cycle arbiter 56. When a cycle is held, the EISA bus may be released from wait states while the cycle completes on the adapter. If a second cycle is generated by the EISA bus while the first one is still pending, then the EISA bus will be held off with wait states until the pending write is performed. In this specific embodiment, pipelining of EISA reads is not supported.

The EISA slave interface also provides an interface to the EEPROM 17. This interface operates to transfer the contents of the EEPROM 17 into the adapter memory after reset.

There are numerous registers in the EISA slave interface module 54, primarily related to configuration of the adapter that conform to the EISA bus specification. These registers do such things as set up the adapter's memory base address, the interrupt level, the transceiver type selection, and the BIOS ROM enable. The configuration registers also provide the host with a positive means of identifying the adapter type and to globally disable the adapter.

B. EISA Master Interface 55

The EISA master interface 55 handles requests from the upload DMA 57 and download DMA 58 for performing bus master operations across the EISA bus. The EISA master interface 55 autonomously arbitrates between pending upload and download requests, because of the EISA bus disallowing mixed reads and writes while performing burst transfers, used by the DMA operations of the preferred embodiment.

The bus master transfers are always initiated by either the upload DMA 57 or the download DMA 58. The transfers may be terminated by either the DMA modules upon completion of a transfer, or by the EISA master interface upon preemption by another arbitrary device on the EISA bus.

Thus, the function of the EISA master interface 55 is to arbitrate for access to the EISA bus when transfer requests are pending from either or both of the upload DMA 57 and the download DMA 58. The EISA master interface 55 performs the signalling necessary to establish first transfers with address slaves on the bus. It also ensures compliance with the EISA bus definitions.

This module also converts real mode segment:offset addresses to 20 bit linear addresses when enabled by the adapter mode logic 59.

C. Master/Slave Union Module 53

The master/slave union module 53 provides for sharing of connections to the EISA bus by the EISA master interface 55 and the EISA slave interface 54. This union module 53 consists primarily of a series of 2:1 multiplexers.

D. Interrupt Controller Module 60

The controller also includes an interrupt controller module 60. The interrupt controller module 60 implements various interrupt and indication functions, including masking and enable/disable mechanisms. Interrupt signals are generated by various modules within the controller, and are routed to the interrupt controller module 60. The interrupt controller module 60 then passes the interrupt signals through various enables and masks before OR-ing them together and driving the result onto the host bus.

The interrupt controller module 60 does not detect interrupt worthy events or acknowledge the interrupts passed to the host. It includes a number of adapter resident registers utilized in the interrupt handling functions.

E. Adapter Mode Module 59

The adapter mode module 59 provides a number of functions including setting various basic operating modes of the controller, and reporting status of various conditions of the controller. The adapter module 59 also establishes the base address of a window register used for diagnostics by the host system. Furthermore, the adapter mode module 59 generates reset functions for the adapter. Also, this module provides the MAC ID register which identifies the media access controller implemented by the device, for communication to various modules within the controller and to the host system.

F. Cycle Arbiter Module 56

The cycle arbiter module 56 is responsible for distributing access to the adapter's RAM resident and ASIC resident registers through the RAM interface 50 among various requestors. It functions to allow timely access to the RAM by modules that are most in danger of suffering an overrun or underrun condition in response to a priority scheme.

G. Multicast Comparator Module 61

The controller illustrated in FIG. 2 also includes a multicast comparator module 61. When enabled by the adapter mode module 59, the multicast comparator module 61 performs a bit by bit comparison of a received frame's destination address field with contents of the multicast address table. The multicast address table is established by the host and stored in RAM 15. A mismatch during this compare, coupled with neither an individual address nor a broadcast address match, will result in the rejection of an incoming frame.

Thus, the multicast comparator module 61 monitors the activity of the Ethernet receiver module 62 and the receive DMA module 63 to determine when a new frame is being received. Each byte that is received by the Ethernet receiver 62 and presented at the parallel interface 64 of the receiver, is shadowed by the multicast comparator module 61. These bytes are then compared against valid entries in a multicast address table accessible by the multicast comparator 61.

The multicast comparator 61 does not establish or maintain the contents of the multicast address table. However, the module detects the host accesses to the table and supplies appropriate redirection offsets to the RAM interface module 50.

H. Statistics Controller Module 65

The preferred system also includes a statistics controller module 65. This module monitors activity of various other modules within the controller, most particularly the Ethernet transmitter module 66 and the Ethernet receiver module 62, and updates statistics maintained in RAM 15 as applicable events occur.

I. Download DMA Module 58

The download DMA module 58 is responsible for issuing requests for bus master downloads of data from the host system to the adapter memory. This data is then deposited within the adapter's onboard transmit data buffer for either immediate or future transmission.

As soon as buffer descriptors are defined and one of the transmit data buffers becomes available, as described below, the download DMA module submits requests for download bus master operations to the EISA master interface 55. The download DMA module 58 performs byte alignment, including any required packing and unpacking to align the data as implied by the respective starting addresses of the host and the adapter.

The download DMA module 58 also includes logic for maintaining the transmit descriptor ring buffer within the adapter's RAM. The download DMA module 58 generates an interrupt in the appropriate mode to indicate completion of the download operation. Also, the download DMA module 58 informs the transmit DMA module 67 when it is time to begin transmission. Various registers involved in the download DMA operation are described in more detail below as they are involved directly in the data buffering process of the present invention.

J. Transmit DMA Module 67

The transmit DMA module 67 operates to fetch bytes from the transmit descriptor buffer, the transmit data buffer, or both, as described below, when directed to do so by the download DMA logic 58. The fetched bytes are then presented in sequence to the Ethernet transmitter module 66.

Thus, the transmit DMA module 67 functions to read the contents of the transmit descriptor ring buffer to determine the extent of immediate data, and the length of the overall frame to be transmitted. If a frame specified does not match the specifications for the network, for instance, is shorter than the 802.3 minimum, and the adapter is so enabled, this module will supply additional bytes of undefined data to the Ethernet transmitter module 66 as padding.

Collision retries in the CSMA/CD network are handled by the transmit DMA module 67. When a collision is indicated by the Ethernet transmitter 66, the transmit DMA module 67 will resubmit the same frame by reinterpreting the frame descriptor in the buffer.

If enabled, and when the transmit complete condition is satisfied, a transmit complete interrupt is generated for handling by the interrupt controller 60 in the transmit DMA module 67.

The transmit DMA module 67 also stores appropriate frame status in the transmit descriptor ring buffer of the adapter upon completion of transmission.

The transmit DMA module 67 also detects underrun conditions, when a shortfall of data available for transmission occurs.

Again, registers involved in operation of the transmit DMA module 67 are described in detail below.

K. Ethernet Transmitter Module 66

The Ethernet transmitter module 66 provides media access control function associated with transmission for an 802.3 standard network. This module accepts parallel data bytes from the transmit DMA module 67 and applies the 802.3 access rules, and supplies serial data to the external encoder/decoder chip.

L. Ethernet Receiver Module 62

Similarly, the Ethernet receiver module 62 is an essential 802.3 implementation. This module accepts serial data from an external encoder/decoder, applies the 802.3 rules to the data and presents the data in parallel form for use by the receive DMA module 63. Thus, the Ethernet transmitter 66 and Ethernet receivers perform the standard CSMA/CD functions.

M. Receive DMA Module 63

The receive DMA module 63 is a functional complement to the transmit DMA module 67. This module is responsible for accepting parallel data bytes on the Ethernet receiver 62 and depositing them in the adapter's receive ring buffer.

The receive DMA module 63 is responsible for assembling bytes from the Ethernet receiver into 32 bit words prior to storage in the adapter's RAM. At completion of frame reception, the frame's status and length are deposited within the receive ring buffer for use by the host system.

The receive DMA module 63 is also responsible for establishing and maintaining of the receive buffer ring within the RAM of the adapter as described in detail below. Furthermore, the positioning of the "LOOK-BUF" register allowing the host to view received data, as mentioned below, is handled by the receive DMA module 63.

The receive DMA module 63 also handles interrupt indications under appropriate conditions.

N. Upload DMA Module 57

The upload DMA module 57 performs data transfers from the receive buffer through the RAM interface 50 to the host system. Thus, the receive ring buffer is managed by the receive DMA module 63 and interpreted by the upload DMA 57. Actual bus master transfers are carried out by the EISA master interface module 55.

The upload DMA module 67 interprets data structures deposited in the receive ring buffer by the receive DMA module 63 including the location and length of a received frame. It also reads the transfer descriptor which is defined by the host system to determine how many bytes of the frame to transfer, and where in the host memory to transfer the frame.

The upload DMA module 57 requests bus master cycles from the EISA master interface module 55 in response to valid transfer requests deposited by the host.

The upload DMA module 57 also utilizes an interlock between the receive DMA module 63 and the upload DMA module 57, to reduce the transfer rate to the host system to prevent "getting ahead" of the frame being received through the receive DMA module 63. Finally, this module generates interrupts indicating completion of a transfer for use by the host.

O. RAM Interface Module 50

The RAM interface module 50 provides multiplexers and masks for various functions involved in addressing the RAM. The module multiplexes the various address and data sources together to form parameters for RAM access cycles. This module 50 is responsible for gathering up data from the various other modules on the controller that can be read by the host system. Additionally, this module applies a mask to the data to force unused upper bits to a zero, and latches data words for multicycle reads.

P. JTAG Module

Also included in the controller, though not shown, is a JTAG module which implements a state machine as specified in IEEE standard 1149.1-1990, May 21, 1990. This module provides a scan test of the ASICs pins for use during manufacture.

Q. The Autonomous Access Address Bus Definition

The multi-cast comparator 61 statistics controller 65, download DMA 58, transmit DMA 67, receive DMA 63, EISA slave interface 54, and upload DMA 57 all require autonomous access capabilities through the RAM interface 50 to the adapter's RAM. The autonomous accesses are those that occur independently of any cycles that may be occurring on the host bus.

This requirement requires the capability to generate and communicate address information for use by the RAM interface 50. In the case for the receive DMA 63, transmit DMA 67, and download DMA 58, the capability is implied by the DMA logic which drives offset buses. Similar offset buses dedicated to the autonomous accesses are provided for use by the statistics controller 65, upload DMA 57, and multi-cast comparator 61.

FIG. 4A schematically defines the structure of the autonomous access address buses. The various functional modules are given like reference numbers, as provided in FIG. 4.

The multi-cast comparator 61 drives the multi-cast offset bus [6:2] to supply a variable offset to the RAM interface 50 for addressing individual locations within the multi-cast address table. A valid value is presented during the associated autonomous access cycle.

The statistics controller 65 drives the statistics offset bus [7:2] to supply a variable offset to the RAM interface 50 for addressing individual locations within statistics region of the adapter's RAM. A valid value is presented during the associated autonomous access cycle.

The upload DMA 57 drives the upload DMA offset bus [14:2] to supply a variable offset to the RAM interface 50 for addressing individual locations within a receive buffer ring. A valid value is presented during the associated autonomous access cycle.

The download DMA 58 drives a download DMA offset bus [12:2] to supply a variable offset to the transmit buffer/transmit descriptor region of the RAM during autonomous cycles. Two select signals generated by the download DMA logic 58 are used to distinguish between the two RAM regions. Also, the download DMA logic 58 generates a download DMA byte enable [3:0] to indicate which byte lanes of the 32 bit data bus extending from download DMA 58 to the RAM interface 50 contain valid data. The valid value is presented during the associated autonomous cycle.

The receive DMA 63 drives a receive DMA offset bus [14:2] to convey a variable offset within the 22K byte receive buffer region of the RAM.

Finally, the transmit DMA logic drives a transmit DMA offset bus [12:2] to supply a variable offset to the transmit buffer/transmit descriptor region of the RAM during autonomous cycles. The two select signals generated by the transmit DMA 67 are used to distinguish between the two RAM regions.

IV. Transmit and Receive Data Flow and Structure

Figure 5:
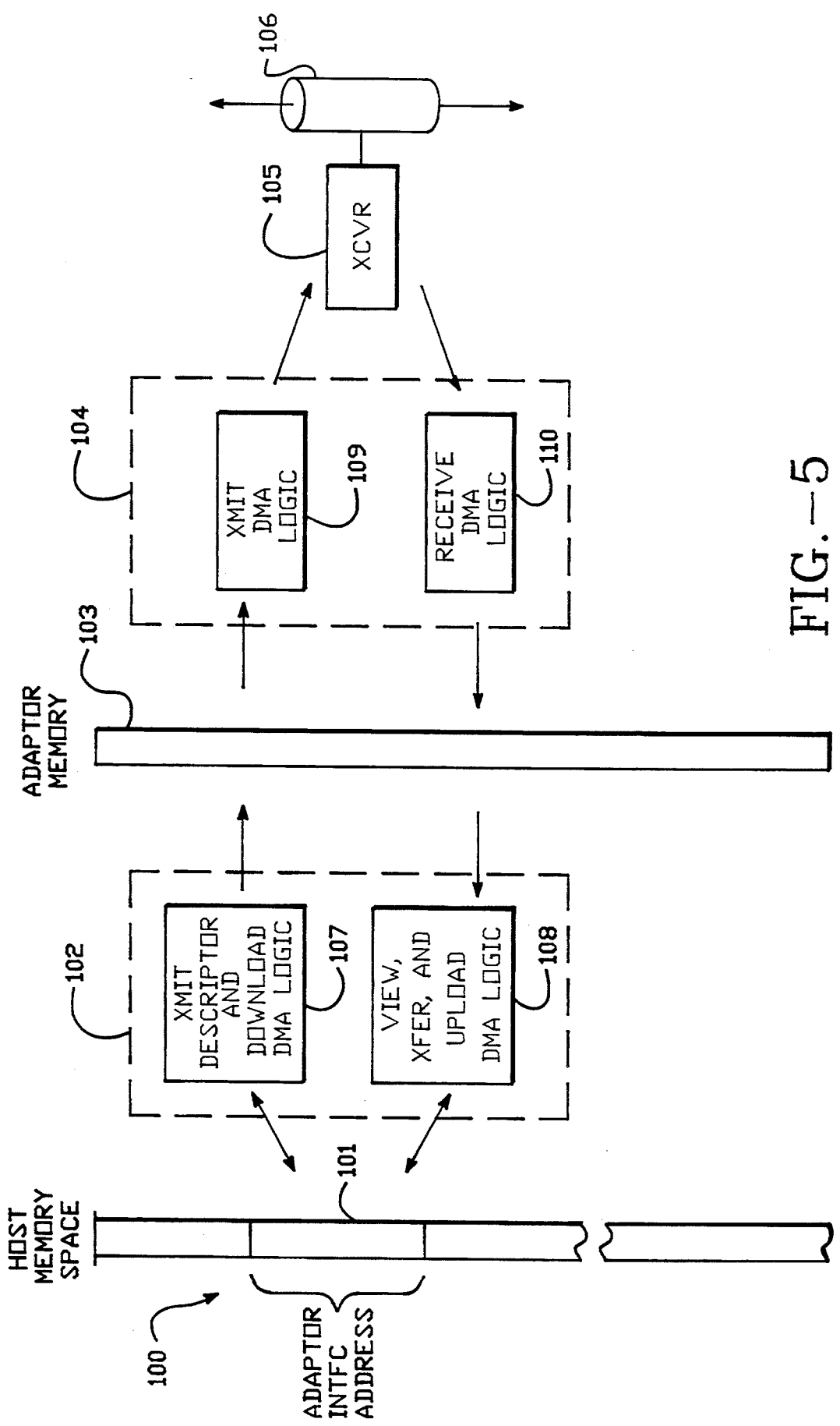
FIG. 5 a schematic diagram illustrating data flow from the host memory space through adapter memory to the network according to the present invention.

FIG. 5 provides a heuristic data flow diagram of an adapter according to the present invention emphasizing the host interface, the adapter memory and the network interface data flow for transmission and reception.

As mentioned above, the host system will include a host memory space (generally 100) defined by the addresses on the host bus. A pre-specified block 101 of the host memory space is set aside for the adapter interface addresses. The adapter includes host interface logic 102 which is responsive to accesses across the host bus within the adapter interface address block 101. Also in the adapter is a host independent memory 103. The host interface logic operates to map the transfer data between the specified block 101 of addresses and the independent memory. The adapter also includes network interface logic 104 which is coupled to the adapter memory. The network interface logic manages transfers of data from buffers in the independent memory 103 and the network transceiver 105. The network transceiver 105 then supplies the data onto the network medium 106.

The host interface logic includes a transmit descriptor logic and a download DMA logic (generally 107) used in the transmit process, and view logic, transfer descriptor logic, and upload DMA logic (generally 108) used in the receive process. These modules basically manage communication of data between the independent memory 103 and the host in response to reads/writes by the host system to the adapter interface address block 101. This relieves the host of any address translations or buffer management functions for the transmit and receive operations.

The network interface logic 104 includes transmit DMA logic, (generally 109) and receive DMA logic (generally 110). The transmit DMA logic 109 is responsive to descriptors stored in the adapter memory 103, as described below, for moving data out of the independent adapter memory 103 to the network transceiver 105. Similarly, the receive DMA logic 110 is responsible for moving data from the transceiver 105 into the independent adapter memory 103. Thus, all communications of data from the network medium 106 are coupled directly into host independent memory 103. Communications from the host independent memory 103 are then controlled through the host interface logic 102 in response to a memory mapped region in the host memory space, greatly simplifying the protocol software necessary to communicate with the network.

Figure 6:
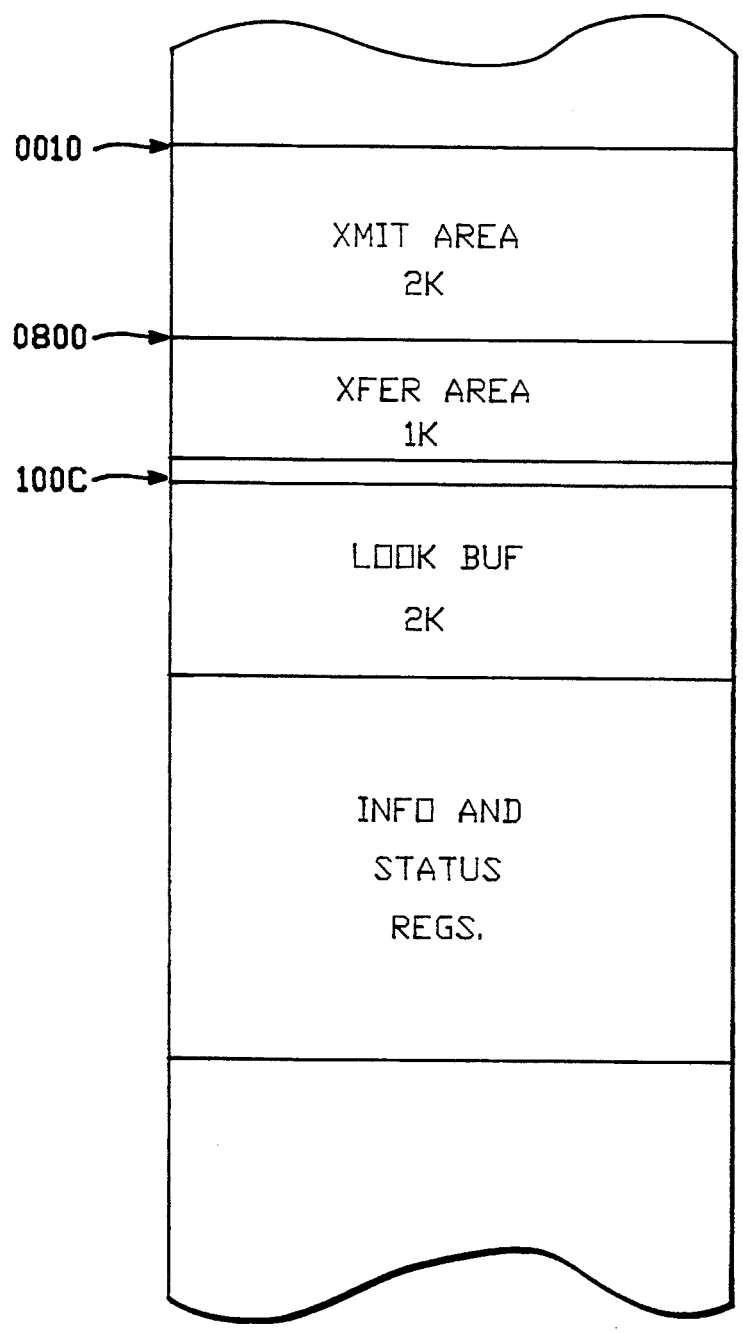
FIG. 6 is a map of the host system address space used for any transmission of data according to the present invention.

FIG. 6 provides a simplified map of the host address block 101 used by the host interface. The addresses within this block appear to the host like memory mapped registers in a continuous 8K block of the host address space in a preferred system.

For the EISA embodiment, "registers", or mapped areas, in the block 101 are located on double word address boundaries, thus, addresses are a multiple of four. Many of the "registers" occupy several double words (as many as 509) of memory space.

Although the "registers" are memory mapped to an arbitrary pre-specified block of host address space, none of the reads or writes performed by the host system to these registers actually directly access the adapter memory. Rather, the accesses to the memory mapped space are interpreted by the host interface logic 104 transparent to the host system. Thus, the memory in the adapter is independent of the host address space and of host management. FIG. 6 provides an overview mapping of the host address space used for accessing these registers. The registers include primarily a transmit area register (XMIT AREA) at offset 0010 (hex), a transfer area register (XFER AREA) at offset 0800 (hex), and a look buffer (LOOKBUF) at offset 100C (hex). Various status, statistics, information, and indication registers are distributed throughout the balance of the area.

The XMIT AREA register is used by the host to write transmit descriptors into the adapter. The transmit descriptors are described in more detail below, but include data that identifies data to be compiled and transmitted as a frame, and may include immediate data. The XMIT AREA at offset 0010 (hex) is approximately 2K bytes in size. This data is mapped into a transmit descriptor ring in the independent adapter memory as described below.

The XFER AREA at offset 0800 (hex) in the adapter interface host address block is a buffer of approximately 1K byte through which transfer descriptors are written into the independent memory of the adapter. The LOOKBUF area at offset 100C (hex) is a buffer of approximately 2K bytes providing a read only window into a receive ring buffer within the host independent adapter memory. More details of the receiver process are provided in the above cross-referenced application entitled NETWORK INTERFACE WITH HOST INDEPENDENT BUFFER MANAGEMENT.

FIG. 7 provides a map of the host independent memory on the adapter. This memory is organized into a transmit data buffer at offset 0 of approximately 3K bytes, a transmit descriptor ring at offset 0C00 (hex) of approximately 5K bytes, a receive buffer ring at offset 2000 (hex) of approximately 22K bytes, and a transfer descriptor area at offset 7800 (hex) of approximately 1K bytes is provided in the independent memory. The last three areas of memory include adapter information, network statistics, and multicast address tables for use by the adapter.

In the preferred system, the adapter uses 32K bytes of static RAM for the transmit buffers, receive buffers, control structures, and various status and statistics registers. Several of the regions in the adapter's memory defined in FIG. 5 provide defined data structures.

A. Transmit Data Buffer

The transmit data buffer occupies 3K bytes as mentioned above. This region is divided into two 1.5K buffers. Only the data that are downloaded to the adapter via bus master transfers are stored in these buffers. The controller will use both the contents of the transmit data buffer and the immediate data portion of the transmit descriptors, when encapsulating a frame for transmission. The adapter automatically alternates the use of the buffers after choosing the buffer closest to the base of the memory as the power up default.

The transmit buffers are shared by the download DMA logic and the transmit DMA logic. The transmit DMA logic may switch from buffer 0 to buffer 1 and back again freely. The only restriction being the availability of transmit data as defined by the transmit start threshold register. The transmit DMA module switches from one buffer to the other whenever it has completed a transmission. The buffer switch occurs regardless of whether or not the transmission was successful and regardless of whether or not bus master download data were used in the preceding transmission.

The download DMA module may only switch from one buffer to the other, if the buffer it is going to switch to is not being used by the transmit DMA module. Download DMA will attempt to switch from one buffer to another every time it completes processing of a transmit descriptor as described below, regardless of whether or not any bus master operations were called for in the preceding descriptor. However, it will not change to a buffer that is in use by the transmit DMA module.

B. Transmit Descriptors

Transmit descriptors define frames that are pending transmission, and hold the status of frames that have been transmitted. These descriptors are of variable length and are arranged in a sequential fashion around a 5K byte ring buffer as mentioned above. The first entry of the descriptor must align on a double word boundary. FIG. 8 illustrates the transmit descriptor data structure.

The bulk of the contents of an entry into the transmit descriptors region is copied verbatim from the data supplied by the host processor via the XMIT AREA illustrated in FIG. 6. However, in order to comply with the format requirements of the XMIT PROT ID and XMIT FRAME STATUS registers and to supply sufficient information for frame transmission and buffer management; one value must be relocated and several must be deposited automatically.

The host processor's writes to the XMIT AREA are offset automatically by the adapter such that the first value written—XMIT PROT ID and XMIT REQ HANDLE—end up in the fifth 32 bit word location (offset 10 (hex)) in the next available data structure in the ring. This means that the XMIT REQ HANDLE value is written by the host to the location reserved for the MACID value. Immediately after the XMIT REQ HANDLE value is written to the adapter's RAM, the adapter must copy the contents of the least significant 16 bits of the fifth 32 bit word location to the most significant 16 bits of the fourth 32 bit word location. After copying XMIT REQ HANDLE, the adapter will retrieve the MACID value from the MACID register and write that to the location vacated by XMIT REQ HANDLE. Later, after frame transmission, the least significant 16 bits of the fourth 32 bit location (offset C (hex)) will be updated with the transmit frame's status.

The NEXT DESCRIPTOR POINTER entry may be updated by the adapter any time after the XMIT BUFFER COUNT and XMIT IMMED LEN values have been written to the adapter. Because the data written to the XMIT AREA register must be written in a precise order to exact locations, the writes of these two values can be easily detected and used for the descriptor size calculations required to determine the start of the next descriptor without having to retrieve the values from RAM.

Finally, once the last XMIT DATA LEN value has been written to the adapter, the frame length can be calculated and deposited in the FRAME LENGTH position of the data structure. This value is also copied to the XMIT FRAME LENGTH register in the controller chip for immediate use by the host.

The next several paragraphs define each of the fields of the transmit descriptor data structure.

The NEXT DESCRIPTOR POINTER value points to the first word of the next descriptor. This value is updated immediately after the host reads XMIT QUEUE STATUS. NEXT DESCRIPTOR POINTER being defined does not necessarily imply that the location pointed to contains a valid descriptor. It merely indicates where the next valid descriptor may be found once it is defined.

The FRAME LENGTH field is computed and updated by the adapter. The frame length is calculated by summing all of the XMIT DATA LEN values and the XMIT IMMED LEN value. The resulting sum is the total number of bytes in the transmit frame. If the sum is less than the 802.3 minimum frame length, then the sum will be set to the minimum frame length value. The sum is written to the FRAME LENGTH line of the transmit descriptor and is also made available to the host via the XMIT FRAME LENGTH register.

The XMIT FAILURE field contains the error code that is made up of the status bits gathered from the Ethernet transmitter after the completion of transmission. This field is mapped to the XMIT FAILURE register for host access.

The XMIT REQ HANDLE value is interpreted by the transmit DMA controller to determine whether or not to generate an indication upon completion of the transmission attempt(s) for the associated frame. If the field is non-zero, an indication will be generated. Also, the frame's entry in the transmit descriptor ring will be maintained until the host has had an opportunity to examine the transmit status. The XMIT REQ HANDLE, XMIT STATUS, XMIT PROT ID, and the MACID fields are all made available to the host when an indication is generated. If XMIT REQ HANDLE is a zero, then the transmit descriptor queue entry is discarded after transmission without notifying the host in any way. Transmit underrun conditions are posted regardless of a zero XMIT REQ HANDLE.

The XMIT STATUS field contains the transmit status for the associated frame. The contents of this field are updated immediately after the transmission attempt(s). The return codes are defined in the XMIT STATUS register definition.

The XMIT PROT ID value in this field is merely maintained within the queue for use by the host upon completion of the transmission to identify the particular protocol responsible for the frame. It allows simultaneous activity of multiple protocols. Together XMIT PROT ID and XMIT REQ HANDLE uniquely identify a frame passing through the adapter.

The MACID, like XMIT PROT ID, is maintained within the queue for use upon completion of the transmission. However, the host does not write this value to the adapter via the XMIT AREA register. Rather, the host stores this value once in the MACID register and then depends upon the adapter to deposit this value into the descriptor data structure after XMIT REQ HANDLE has been copied to its final position.

The contents of the XMIT BUFFER COUNT field are supplied by the host via a write to XMIT AREA. This field specifies the number of buffers within the host's memory that are used to make up the transmit frame. Each of the buffers is transferred in the order listed from the host's memory to the adapter's transmit data buffer as soon as one of the two transmit data buffers becomes available. If XMIT BUFFER COUNT is zero, then no bus master operations will be performed for this frame.

The XMIT IMMED LEN field, defined by a write from the host to XMIT AREA, specifies the number of "immediate" data bytes that will be supplied by the host. If this field is zero, then the next 32 bit word location will contain the first host data buffer descriptor and the entire frame will be transferred to the adapter via bus master cycles. The XMIT IMMED LEN value will not necessarily be a multiple of four. The location of the first host data buffer descriptor is determined as follows:

DESCRIPTOR OFFSET=((*XMIT IMMED LEN*+3) & *fffc*(hex))+18(hex).

The variable length IMMEDIATE DATA field contains the immediate data deposited to the adapter by the host using memory writes to XMIT AREA. This field may vary in length from 0 to 1.514 bytes. Immediate data is inserted into a transmit frame between the preamble and the transmit buffer data (if any) by the adapter during transmission. Generally, immediate data is made up of the destination and source addresses and any protocol-specific header data. It is reasonable, however, for the entire transmit frame to be considered immediate data. This would make it unnecessary for the adapter to perform any bus master operations to fetch the remainder of the transmit frame. If XMIT IMMED LEN is zero, then this field is skipped and the entire frame is assumed to reside in host memory resident data buffers. If XMIT IMMED LEN does not specify an integral number of double words, then the host may round up to the nearest multiple of 4 and write up to that number of bytes. The extra bytes, beyond XMIT IMMED LEN, will be ignored and not included as part of the transmitted frame.

The XMIT DATA LEN field, one of two entries per host data buffer descriptor, defines the number of bytes in the associated host buffer. This value need not be a multiple of four.

The 32 bit XMIT DATA PTR value is the physical starting address of the associated host data buffer. This value need not be a multiple of four.

V. Transmission Process

Figure 9:
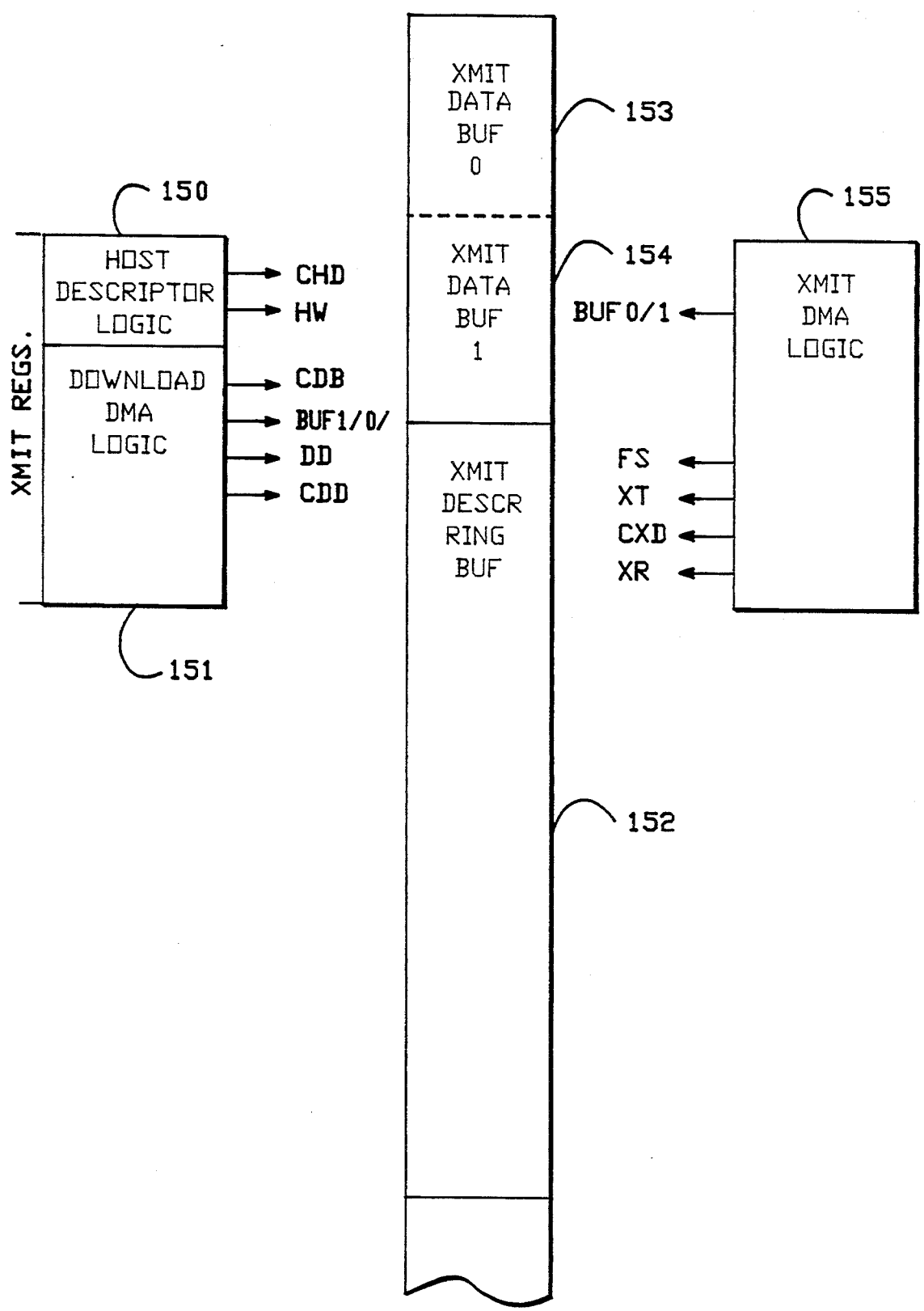
FIG. 9 illustrates the management of the transmit descriptor ring buffer and transmit data buffer, and pointers used during the transmit operation according to the present invention.

FIG. 9 illustrates the network interface logic and host interface logic used in managing the transmit data buffer and transmit descriptor ring buffer in the independent memory on the adapter. On the host interface side, the logic includes host descriptor logic 150 and download DMA logic 151. The host descriptor logic 150 and download DMA logic 151 are coupled to the host address space through the transmit "registers" including the XMIT AREA register, the XMIT COMPLETE THRESH register, the XMIT FAILURE register, the XMIT FRAME LENGTH register, the XMIT FRAME STATUS register, the XMIT PROTID register, the XMIT QUEUE STATUS register, and the XMIT START THRESH register. Details of these registers are described below.

The descriptors illustrated in FIG. 6 are stored in the transmit descriptor area of the host independent RAM on the adapter by host writes to the XMIT AREA address block. Three different processes act upon entries in the descriptor queue. The host writes to initially create transmit descriptors, bus master downloads to move buffer data from host memory to the transmit data buffer and transmission of described frames on the network. The first two processes occur within the download DMA logic 151 and the host descriptor logic 150. Transmission is performed by the transmit DMA logic 155. During the course of adapter operations, the number and status of descriptors in the transmit descriptor ring buffer 152 will vary according to the relative speeds of the host write, download, and transmission processes.

Two variables within the download DMA logic 151 helped describe the status of the transmit descriptor queue. ZERO DOWNLOADS PENDING indicates that there are no complete frame descriptors yet to be processed by the download DMA logic 151 for download. The ZERO FRAMES RESIDENT variable indicates that there are no descriptors which have been already processed by the download process, but are yet to be transmitted.

Each of the three processes that make up the transmission mechanism maintains its own set of pointers to the descriptor queue.

The host descriptor logic 150 generates pointers for the transmit descriptor ring buffer 152 on the adapter memory, which identify the current position of host accesses for writing descriptors in the transmit descriptor ring buffer 152. These pointers are designated the current host descriptor pointer CHD, and the host write pointer HW. The current host descriptor pointer CHD points to the base address of a descriptor currently being written, or expected to be written by the host. The host write pointer HW points to the location within the current descriptor (pointed to by the CHD pointer) to which the host is expected to write next. That is, the HW pointer predicts the offset within the XMIT AREA address block at which the host will be writing to complete the current descriptor.

The download DMA logic 151 generates 3 pointers, and a buffer select signal, while managing downloads from the host system into the transmit data buffers XMIT DATA BUF0 153 and XMIT DATA BUF1 154. The pointers generated by the download DMA logic 151 include the current download descriptor pointer CDD which points to the base address of a descriptor that is currently being processed by the bus master download DMA logic 151. The second pointer generated by the download DMA logic includes the download data pointer DD which points to the location within the current transmit data buffer (either XMIT, DATA BUF0 or XMIT DATA BUF1) to which the download process is writing data. The third pointer generated by the download DMA logic 151 includes the current download buffer CDB pointer. The CDB pointer points to the buffer descriptor within the transmit descriptor pointed to by the CDD pointer, in which the specification of the buffer in host memory subject of a current download process resides.

The download DMA logic also selects the current transmit data buffer 153 and 154 to which the download DMA logic transfers data in the bus master operation as heuristically illustrated by signal BUF1/0.

The transmit DMA logic 155 generates three pointers for the transmission process. These pointers include the current transmit descriptor CXD pointer, which points to the base address of the descriptor in the transmit descriptor ring buffer 152 currently being processed by the transmit logic 155. The transmit read XR pointer indicates the location within the current descriptor or current transmit data buffer (153 or 154) from which the transmission process is reading data to be transmitted.

The XMIT TAIL pointer (XT) points to the back end of the queue. The XT pointer points to an older descriptor in the transmit descriptor ring buffer 152 than the CXD pointer when there are frames that have completed transmission, but have not yet had their status information read by the host system.

The preferred system operates in two modes relative to generating indications to the host of the completion of a transmission. The preceding paragraphs described the data structures associated with host write, bus master download, and transmission processes when a XMIT COMPLETE ON DOWNLOAD variable is false and the indication is generated when the transmission is complete, or when XMIT COMPLETE THRESH (described below) is met. When XMIT COMPLETE ON DOWNLOAD is true, the download DMA logic 151 is also responsible for keeping track of the frames for which status has not been read. In this mode, the host receives the transmit complete indication for a frame upon download of the frame, so it is possible that the frame can be transmitted before the host is able to respond to the indication. This condition allows the XMIT TAIL pointer to no longer define the oldest useful entry in the descriptor ring buffer. Therefore, a frame status process is necessary. The frame status pointer FS points to the base address of the oldest descriptor for which status has not yet been read by the host, in this mode of operation. Since the FS pointer is related to the transmit process, it is illustrated heuristically in the transmit DMA logic 155 in FIG. 9. In the preferred system, however, it is logically coupled with the download DMA logic 151.

The transmit DMA also selects the current transmit data buffer 103 or 104 from which a current transmit frame is being composed, as indicated heuristically by the signal BUF0/1.

The interface to the adapter is seen by the host as if it were a set of registers at a prespecified address block. The significant "registers" involved in transmission are outlined below.

A. XMIT AREA

The purpose of this register is to provide a mechanism for the host to supply the adapter with immediate data and a data structure that defines where in the host's memory system the remainder of the frame (if any) resides. The adapter stores this information in the transmit descriptor ring 152 for use when the frame being described can eventually be transmitted.

The adapter uses the address to which the data is written and the order in which it is written to determine what the data represents. The data must be written to the adapter using the structure and order described above with respect to FIG. 6.

Bus master downloads begin after a descriptor has been written to XMIT AREA and XMIT QUEUE STATUS (described below) has been read by the host.

Once the host has completed the transfer of the transmit descriptor buffer structures to XMIT AREA, the host may read XMIT FRAME LENGTH to determine the number of bytes that the host has specified to be included in the transmit frame. XMIT QUEUE STATUS should then be read to advance the CHD pointer so that another frame may be written to this register. After reading XMIT QUEUE STATUS, the contents of XMIT FRAME LENGTH are undefined, until XMIT AREA is filled again.

The actual frame transmission onto the network will commence when two conditions are met: (1) the XMIT START THRESH (described below) condition has been met, or, if XMIT START THRESH is zero, when the entire frame has been copied to the adapter's RAM, and (2) when there are no previously queued transmit requests. If more than XMIT START THRESH bytes of immediate data are written to XMIT AREA, then network transmission may begin before XMIT QUEUE STATUS is read.

If the adapter runs out of XMIT AREA resources while the host is writing data to XMIT AREA, the host will be returned a value of 6 when it reads XMIT QUEUE STATUS. The writes that exceed the capacity of the descriptor buffer will not corrupt data already queued up on the adapter.

The transmit frame's destination and source addresses must be explicitly supplied to the adapter by the host for each frame transmitted. This information can be provided as part of the immediate data or, if there is no immediate data, as the first twelve bytes of the first data buffer specified in the descriptor.

Essentially, the host provides every byte of the frame between the start of frame delimiter and the frame check sequence (CRC) through the XMIT AREA register or download DMA operation.

B. XMIT COMPLETE THRESH

XMIT COMPLETE THRESH provides for an early indication of transmission completion.

The XMIT COMPLETE THRESH register is used to specify the number of transmit bytes that remain to be either transmitted or downloaded to the adapter (depending upon the adapter mode) before the adapter will issue a XMIT COMPLETE indication. Only bits 10 through 0 are implemented in this register. Values greater than the maximum frame length will prevent this function from operating properly. The method for disabling this function is to set the register to zero. The value in XMIT FRAME LENGTH (see below) is used to determine where the end of the transmit frame is.

If this threshold value is set too high, then the host will respond to the indication before the adapter can provide a valid transmit status indication. If XMIT FRAME STATUS returns a ff (hex), then XMIT COMPLETE THRESH should be adjusted to delay the indication slightly. This is accomplished by reducing the value in the XMIT COMPLETE THRESH register. The function of this register is disabled during the transmission of the first 60 bytes of the frame. This register is cleared to 0 during a reset.

C. XMIT FAILURE

XMIT FAILURE returns the cause of a transmit failure.

This register returns the cause of the failure of the attempt(s) to transmit a queued frame. A non-zero value indicates that the frame encountered one or more errors during the transmission attempt.

The bits in this register are defined as follows:

| | |
|---|---|
| bit 0 | DMA UNDERRUN |
| bit 1 | LOSS OF CARRIER SENSE |
| bit 2 | MAX COLLISIONS |
| bit 3 | SQE TEST FAILED |

This register will contain valid data regardless of the success or failure of the attempt to transmit a frame. If there was no failure, then this register will contain a value of 0 (hex). The contents of this register are valid after the frame has completed transmission (low byte of XMIT FRAME STATUS not equal to ff (hex)) and before XMIT PROT ID is read.

If a data underrun occurs, the adapter will force a CRC error into the frame during transmission to assure that the frame is received as a bad frame and is discarded by the destination device.

D. XMIT FRAME LENGTH

XMIT FRAME LENGTH returns the number of bytes to be transmitted.

The XMIT FRAME LENGTH register returns the total number of bytes queued up for transmission by the current transmit frame descriptor identified by CXD pointer. This value is the total of the number of immediate data bytes and of all of the buffer length fields downloaded to the adapter for this frame. The value returned by this register does not reflect the effects of any padding of the frame that may be done by the adapter when the frame is less than 60 bytes in length.

The XMIT FRAME LENGTH register becomes valid immediately after the host writes the last byte to XMIT AREA and remains valid until the first write to XMIT AREA after a read of XMIT QUEUE STATUS.

E. XMIT FRAME STATUS

XMIT FRAME STATUS returns the results of a transmit attempt.

The least significant 16 bits of this register return the status of the attempt(s) to transmit a queued frame. The most significant 16 bits returns the XMIT REQ HANDLE for the frame. A value of XXXX0000 (hex) (XXXX is the XMIT REQ HANDLE for this particular frame) is returned for a successful transmission while XXXX000a (hex) is returned for a failed transmission. XXXX00fe (hex) is returned if the adapter is in the process of retrying a transmission after a collision. If the transmission is still in progress, XMIT FRAME STATUS will return a XXXX00ff (hex).

If the frame was not transmitted successfully the specific cause of the transmit failure is available in XMIT FAILURE. Reading XMIT PROT ID advances XMIT FRAME STATUS to the status of the next transmitted frame, if any. If the "retry" status value is returned when XMIT FRAME STATUS is read, then reading XMIT FRAME STATUS will also clear the XMIT COMPLETE indication.

F. XMIT PROT ID

XMIT PROT ID returns the protocol ID of the transmit frame.

As soon as the adapter has completed its attempt(s) to transmit a queued frame and has posted its status, XMIT PROT ID can be read by the host as a method of identifying the frame. The value returned here is the same value that was written into the XMIT PROT ID field during the queuing of the frame via XMIT AREA.

Reading this register clears the XMIT COMPLETE indication except when the "retry" status value is read from XMIT FRAME STATUS. If "retry" was read, then reading XMIT FRAME STATUS will have cleared XMIT COMPLETE.

The XMIT PROT ID value resides in the upper 16 bits of the 32 bit register. The least significant 16 bits of this register will return the MACID value written to the MACID register. A double-word read will return both values simultaneously.

As multiple frames can be queued up for transmission, so can multiple transmission results be queued. Reading both words of XMIT PROT ID advances the completion status in XMIT FRAME STATUS, XMIT FAILURE, and XMIT PROT ID to the status of the next frame which has completed transmission, if any.

G. XMIT QUEUE STATUS

XMIT QUEUE STATUS returns the results of queuing a transmit frame.

A read of the XMIT QUEUE STATUS register returns the status of the host's attempt to queue up a transmit frame via XMIT AREA.

2 (hex)—Success: If the transmit request was successfully queued, this value is returned when XMIT QUEUE STATUS is read.

6 (hex)—Out of Resources: If the adapter runs out of queue storage RAM, then a status of 6 (hex) is returned.

7 (hex)—Frame Too Long: if the total number of bytes to be transmitted in a single frame exceeds the maximum frame length, this register will return a 7 (hex).

a (hex)—Order Violation: If the data written to XMIT AREA is written out of order, then this error code is returned.

ff (hex)—Adapter Not Ready: If XMIT QUEUE STATUS is read too quickly after the completion of the writes to XMIT AREA, it is possible to read the status value before the queuing process is complete.

Reading this register also advances XMIT AREA so that another transmit may be queued. This register MUST be read after all of the data has been written to XMIT AREA and before the next transmit request is written to XMIT AREA.

If an error code (6 (hex), 7 (hex), a (hex), or ff (hex)) is returned by XMIT QUEUE STATUS, then the frame was not queued and the host will have to attempt to queue it up another time. If the frame was flagged as being too long, it will have to be broken up into multiple frames before another queue attempt can be made.

If the code indicating success (2) is returned, then the host may immediately proceed to attempt to queue up an additional frame. The number of frames that can be queued depends on the amount of RAM on the adapter allocated for this purpose and the amount of immediate data included in each frame.

If the host attempts to queue a frame that is too large and also exceeds the available TRANSMIT DESCRIPTOR free space, the error that occurs first will take precedence and will be returned to the host.

H. XMIT START THRESH

XMIT START THRESH provides for an early start of transmission.

The XMIT START THRESH register is used to specify the number of transmit bytes that must reside on the adapter before it will start transmission. Values greater than the maximum frame length will prevent this function from operating properly. The method for disabling this function is to set the register to zero. Bytes are counted starting with the first byte of the destination field of the transmit frame.

The number of bytes considered to be available is the sum of the immediate data written to XMIT AREA by the host and those bytes transferred to the transmit data buffers in the adapter using bus master DMA operations. The transmit request will be posted immediately after XMIT START THRESH transmit frame bytes are made available from the immediate data or when the adapter has bus-mastered XMIT START THRESH-XMIT IMMED LEN bytes onto the adapter.

The number of bytes resident on the adapter must be equal to or greater than the value in XMIT START THRESH for the transmission to commence, unless the total frame size is less than XMIT START THRESH. In that case, the frame will begin transmission when the entire frame has been copied to the adapter. The actual transmission of the frame may be delayed by previous pending transmit frames and by deferrals to network traffic. This register is set to zero during a reset.

I. TRANSMISSION RING MANAGEMENT

FIGS. 10A-10E illustrate the progression of the pointers used in the transmit operation. In FIGS. 10A-10E, a portion of the transmit descriptor ring generally 200 and the transmit data buffers 201-0 and 201-1 are shown. Also, the pointers abbreviated as discussed above are indicated. One might also represent the transmit descriptor ring 200 in a circular fashion, as done below in FIGS. 12A-12F for the receive ring.

In FIG. 10A, the host descriptor logic is writing a first descriptor into the transmit descriptor ring 200. Thus, the CXD pointer points to the base address of the first descriptor, the HW pointer points to the offset from the base address to which the host is expected to write the next double word of the descriptor. The download pointers including CDD, CDB are also pointing to the base address of the first descriptor as no download operations have begun. Likewise, the transmit descriptors CXD and XR point to the same base address. Finally, the tail of the ring XT points to the beginning descriptor. The download data pointer DD points to the top of a first buffer, for instance, buffer zero.

As illustrated in FIG. 10B, the first descriptor has completed writing and has begun the download process, and the host has begun writing a second descriptor. Thus, the host descriptor logic pointer CHD points to the base address of the next descriptor, and the HW pointer points to the expected address of the next byte. The download pointer CDD points to the base address of the first descriptor. The down DMA logic is assumed to be in the process of transferring buffers from host into the transmit data buffer. Thus, the CDB pointer points to a descriptor of a download buffer in the first descriptor, and the DD pointer points to an offset within the transmit data buffer at which data is being downloaded. No transmit operations are yet to begin because the threshold has not been reached. Thus, the transmit pointers and the tail pointer still point to the first descriptor.

In FIG. 10C, the host descriptor logic is working on a third descriptor, the download logic is working on the second descriptor, and the transmit logic is working on the first descriptor. The host descriptor logic pointers CXD and XR are working on the first descriptor. Thus, the CXD pointer points to the base address of the first descriptor, and the XR pointer points to immediate data being read for transmission by the transmit DMA logic.

The transmit read pointer XR will complete reading the immediate data and then move to the transmit data buffer filled by the download DMA logic when processing the first descriptor as illustrated in FIG. 10B.

The transmit tail pointer XT still points to base address of the first descriptor.

The download logic is working on the second descriptor. Thus, the CDD pointer points to the base address of the second descriptor, the CDB pointer points to a buffer descriptor within the second descriptor, the DD pointer points to an offset within the second transmit data buffer to which the download DMA logic is transferring data from the host.

In FIG. 10C, the host is writing a third descriptor into the XMIT AREA register. Thus, the CHD pointer points to the base address of the third descriptor, and the HW pointer points to the offset to which the next byte is expected to be written by the host.

In FIG. 10D, the process has moved on so that the host is writing to a fourth descriptor. Thus, the CHD pointer points to the base address of the fourth descriptor, and the HW pointer points to the expected address of the next write to the XMIT AREA register.

The download logic is working on the third descriptor. Thus, the CDD pointer points to the base address of the third descriptor, the CDB pointer points to a buffer descriptor within the third descriptor, and the download data DD pointer points to a location in the first data buffer at which the download is occurring. This operation assumes that the transmit of the first descriptor has freed up the first data buffer for use by the download logic.

The transmit logic is working on the second descriptor. Thus, the CXD pointer points to the base address of the second descriptor, and the XR pointer points to a location in the transmit data buffer from which data is being read by the transmit logic. Since the status of the first descriptor is yet to be read, the transmit tail XT pointer still points to the base address of the first descriptor.

In FIG. 10E, the process is assumed to have progressed so that the write of the fourth descriptor is completed, but the host has ceased writing new descriptors temporarily. In this case, the CHD pointer and the HW pointer point to the base address of a fifth descriptor waiting for further actions by the host. It is assumed that the download process has yet to complete downloading the third descriptor. Thus, the current CDD pointer points to the base address of the third descriptor, and the CDB pointer points to a buffer descriptor within the third descriptor. The DD pointer points to a location in the transmit data buffer to which the download process is downloading data.

In FIG. 10E, it is also assumed that the transmission of the frame identified by the second descriptor is complete, and the transmit logic is waiting for the download operation on a third descriptor to either complete, or download sufficient data that the transmit logic may begin transmission. Thus, the CXD and the XR pointers point to the base address of the third descriptor.

It is assumed that the host has also read the transmit status of the first descriptor. This has the effect of moving the XT pointer to the base address of the second descriptor as illustrated in FIG. 11E.

This process continues with automatic ring wraparound of the descriptors handled by the adapter. Also, overrun and underrun conditions are monitored and appropriate error signals indicated by the adapter.

VI. The Early Transmit Logic

The early transmit logic 6A illustrated in FIG. 1 is implemented primarily in the download DMA logic 58 in the preferred implementation. The key components of a preferred implementation include data path arithmetic described with reference to FIG. 11, and transmit start control logic illustrated with respect to FIGS. 12–17.

FIG. 11 illustrates the basic logic of the data path arithmetic. This logic is founded primarily on 11 bit counter 300. The 11 bit counter 300 includes a test input, a delta input, a counter enable CE input, a clock input, and a reset R input. The outputs of the 11 bit counter 300 include a carryout TC, and a counter output Q [10:0]. The test input is used for testing unrelated to the present invention. The delta input is driven by the download DMA byte enable [3:0], and sets an increment amount for the counter 300 between 1 and 4, based upon the number of bytes in the 32 bit bus that are active in the download process.

The counter enable CE input is driven by the output of AND gate 301. The inputs to the AND gate 301 include the cycleDone signal, and the output of delay circuit 302. The delay circuit 302 receives as inputs the clock and the buffer download acknowledge bufferDwnAck signal. The cycleDone signal is asserted during the last clock of a transfer cycle, and is used in concert with other control signals to generate read and write strobes within the download DMA. The bufferDwnAck signal is a cycle acknowledge signal for buffer download autonomous accesses on the adapter. It is asserted in response to a buffer download request. The delay circuit 302 operates to insure that it stays true for at least as long as the cycleDone signal to insure proper incrementing of the counter.

The cycleDone signal is generated during the last clock of a transfer cycle. It is the basis for incrementing the counter 300 by the amount indicated by data path byte enable [3:0].

The clock input 300 is driven by the system clock. The reset input is driven by OR gate 303. The inputs to the OR gate include a newDescriptor signal indicating when a new descriptor is being processed by the download buffer, a downloadDmaReset signal, and a clearAllCounters signal for clearing counters on the adapter. The output of the counter 300 is supplied on an 11 bit line Q[10:0]. This output is supplied to adder 304. The second input to the adder 304 is the immediate length value immedLenValue [10:0] which is read from the current descriptor. The sum of the immediate length value and the output of counter 300 is supplied as the downloadBytesResident value [10:0].

The data path arithmetic in FIG. 11 also illustrates generation of the bytesResidentValid signal. This signal is generated by a sequence of D-type flip-flops 305, 306 which cause the bytesResidentValid signal, which is normally true, to go inactive for three clocks whenever the counter changes value. This allows for the download bytesResidentValue [10:0] to settle out of the adder and propagate through a comparator in the transmit start control logic described below. Thus, the D-type flip-flops 305, 306 have a reset input which is driven by the output of AND gate 301, and a clock driven by the clock signal. Thus, these flip-flops are reset every time the counter 300 is incremented.

This logic is also used to generate a dataReady signal at the output of OR gate 307. The inputs to this OR gate 307 are the dataPathByteEn signal [3:0]. Thus, the dataReady signal is asserted whenever a valid dataPathByteEn signal is generated.

A downloadCarryOut signal is generated for test purposes by the carryout signal TC of the counter 300.

This logic is also used to generate a downloadDataPointer [11:2]. The downloadDataPointer is generated at the output of adder 308. The inputs to the adder 308 include bits [10:2] of the output Q of counter 300, and the output of the transmit buffer select MUX 309. The inputs to the transmit buffer select MUX 309 include the offsets of the two transmit data buffers which are selected in response to transmit buffer select signal at the select input. Finally, this logic generates a dataPathOffset signal [1:0] at the output of the subtractor 310. The subtractor generates a difference between signals A and B supplied at its inputs. Signal A is supplied at the output of latch 311. The latch 311 latches the two least significant bits [1:0] of the output Q of the counter 300. These two bits are latched in response to the doABuffer signal. The doABuffer signal is a command supplied to the buffer download logic to perform a bus master download of a buffer described in a transmit descriptor. Thus, these two bits are latched at the start of a download operation. The corresponding bits in the 32 bit download start address are subtracted from them to determine the data path offset for the buffer transfer.

Thus, this logic is coupled with the host address and monitors the downloading of data from the host into the transmit data buffer for use in making a threshold determination of the amount of data of a given frame resident in the adapter memory.

The downloadBytesResident [10:0] value is supplied to the transmit start control logic described with reference to FIGS. 12–15. A block diagram of the transmit start control logic is provided in FIG. 12. Each of the functional components of the block diagram in FIG. 12 are described with reference to FIGS. 13–17.

FIG. 12 is a block diagram of the transmit start control logic. The transmit start control logic includes a start threshold register 320, and a download compare block 321 which compares the value of the start threshold with the download bytes resident value generated in the data path arithmetic of FIG. 11. Also, an immediate data comparator 322 is included to perform the comparison in the event that immediate data is present in the transmit descriptor. Finally, a data available control block 323 is included which generates the xmit- DataAvailable signal for supply to the transmit DMA logic block of the adapter.

The transmit start control logic in FIG. 12 is responsible for generating the xmitDataAvailable signal, which is supplied to the transmit DMA module to indicate that there is data available to be transmitted onto the network. The xmitDataAvailable signal is asserted under three conditions: (1) there are one or more complete frames resident on the adapter ready to be transmitted; (2) there are no complete frames on the adapter, but the number of bytes resident for a frame currently being downloaded is greater than the value in the transmit start threshold register; and (3) there are no complete frames on the adapter, and there are no pending download operations, and the number of immediate bytes resident for the frame currently being written to the transmit area register is greater than the value of transmit start threshold.

The start threshold register 320 contains the physical XMIT START THRESH register, and logic to determine when the value in the register is valid. In particular, if the XMIT START THRESH value is written one byte at a time, then the START THRESH VALID signal is deasserted until the second byte is written. This keeps the download compare 321 and immediate compare 322 modules from making comparisons on transitional values. The inputs to the start thresh register 320 include the hostWriteData [10:0] which carries data through the start thresh register 320 during writes to the XMIT START THRESH register in the host interface. The startThreshWrite [1:0] signal are write strobes for the XMIT START THRESH register. The outputs of the start thresh register 320 include the startThreshValue [10:0] and the startThreshValid signal.

The inputs to the download compare module 321 include the startThreshValue [10:0] and the startThreshValid signal. Also, the downloadBytesResident [10:0] and the bytesResidentValid signals are supplied as inputs to the compare module 321. The output of the download compare module 321 is the downloadThreshMet signal.

The inputs to the immediate compare module 322 include the startThreshValue [10:0] and the startThreshValid signal. Also, the immediate length value immedLengthValue [10:0] read from the transmit descriptor, the immedLengthValid signal. The immedLengthValid signal indicates that the value on immedLengthValue [10:0] is valid. Other inputs include the otherHostWrite [3:0] signal which are strobes indicating a host write of immediate data or buffer descriptor data. The four bits of the signal correspond to transfers on the four EISA bus byte lanes. The queueStatusRead signal indicating the host is reading status to prepare writing of a new transmit descriptor, the downloadDmaReset signal, which is a control signal from other portions of the adapter, a clock, a queueError signal, which indicates errors in host writes to the transmit area register; and a testAllCounters and clearAllCounters signals used for diagnostics and testing.

The output of the immediate compare module 322 is the immediateThreshMet signal. The downloadThreshMet and immediateThreshMet signals are supplied to the data available control block 322. The other inputs include the downloadDmaReset signal, the clock signal, and the queueError signals. Also, the zeroDownloadsPending signal and zeroFramesResident signal are supplied to the data available control block 323. These signals indicate when there are no complete transmit frames on the adapter, and when there are no pending download operations occurring, respectively. The output of the data available control block 323 is the xmitDataAvailable signal.

FIG. 13 illustrates the implementation of the start thresh register 320 of FIG. 12. This register is composed of a 3 bit register 330 and an 8 bit register 331 to accommodate high and low bytes of the 11 bit threshold value. The 3 bit register stores bits 10:8 of the hostWriteData [10:0]bus. The 8 bit register 331 stores bits 7:0. The 3 bit register 330 is clocked by the startThreshWrite [1] strobe and the 8 bit register 331 is clocked by the startThreshWrite [0] strobe. Both registers are reset on downloadDmaReset. The outputs of the registers 330 and 331 are supplied as the xmitStartData [10:0].

A start thresh valid state machine 332 is included. This state machine 322 receives as input the startThreshWrite strobes [1:0], the downloadDmaReset signal, and the clock. It contains a simple state machine as illustrated in FIG. 14 to monitor the startThreshWrite [1:0] and deassert the startThreshValid signal whenever one of the startThreshValue bytes is invalid. Thus, the state machine includes 3 states. The first state INIT1 335 is entered on downloadDmaReset. If the startThreshWrite [0] signal is true, and the startThreshWrite [1] signal is false, then the state machine goes to the LOW_BYTE_WRITTEN state 336. When the startThreshWrite [1] signal is next asserted, then the state machine returns to the INIT1 state 335. If, in the INIT1 state 335, the startThreshWrite [1] signal is valid and the startThreshWrite [0] signal is not true, then the third state HIGH_BYTE_WRITTEN 337 is entered. When the startThreshWrite [0] signal is asserted, then the state machine returns to the INIT1 state 335, during which the startThreshValid signal is asserted.

The download compare module 321 is illustrated in FIG. 15. This logic includes a comparator 340 which receives a downloadBytesResident [10:0] value from the data path arithmetic of FIG. 11, and the xmitStartData [10:0] from the start thresh register 320. If the downloadBytesResident value is greater than or equal to the xmitStartData value, then the output of the comparator is asserted. The output of the comparator 340 is supplied to AND gate 341. The AND gate 341 includes three inputs in addition to the output of the comparator 340. The inputs include the startThreshValid signal from the start thresh register module 320, and the output of logic 342 which tests whether the xmitStartData value is equal to zero. If it is not equal to zero, then the signal is asserted.

Finally, the bytesResidentValid signal from the data path arithmetic must be asserted before the downloadThreshMet signal is asserted through the AND gate 341.

The immediate compare module 322 is illustrated in FIG. 16. The immediate compare module 322 comprises an 11 bit counter 350, a first comparator 351, a second comparator 352, and a third comparator 353. Also, the output of the comparators is supplied through multiplexer 354. The immedThreshMet signal is generated at the output of AND gate 355. Also, an OR gate 356 and not equal to zero test logic 357 is included. The immediate compare module keeps track of the number of immediate data bytes resident using the 11 bit counter 350. The inputs to the 11 bit counter include a test signal, otherHostWrite [3:0] signal, which indicates the delta or increment added by each clock, and a clock signal.

The 11 bit counter 350 is reset at the output of OR gate 356. The inputs to the OR gate 356 include the downloadDmaReset signal, the queueStatusRead signal, the queueError signal, and the clearAllCounters signal. The outputs include an immedCarryout signal at the TC output, and the Q [10:0] bus which indicates the number of immediate bytes stored. The immediate bytes output is supplied as inputs to the first and second comparators 351 and 352. The second input to the first comparator 351 is the immedLengthValue [10:0] which is retrieved from a descriptor currently being written. The second input to the second comparator 352 is the xmitStartData [10:0] from the start threshold register module 320.

A third comparator 353 receives inputs including the immedLengthValue and the xmitStartData value.

The first comparator 351 generates a "clipped" signal in the event that the immediate bytes is greater than the immedLengthValue. The second comparator 352 generates the countCrossedThresh signal in the event that the immediate bytes is greater than or equal to the immedLengthValue. The third comparator 353 generates an immedCrossedThresh signal in the event that the immedLengthValue is greater than or equal to the xmitStartData value. The clipped signal is supplied at the select input of multiplexer 354. This operates to cause the multiplexer 354 to select the countCrossedThresh signal as output Y so long as the number of immediate bytes does not exceed the immedLengthValue. When the number of immediate bytes exceeds the immedLengthValue, then the immedCrossedThresh signal is supplied at the output Y of the multiplexer.

The 11 bit counter 350 is incremented by 1, 2, 3, or 4, depending on the value of otherHostWrite [3:0].

The immediateThreshMet signal is supplied at the output of the AND gate 355. The inputs to the AND gate 355 include the output of the logic 357 which is asserted when the xmitStartData value is non-zero. Also, the startThreshValid and immedLengthValid signals are supplied as inputs to the gate 355. When all three of these signals are asserted, then the output of the multiplexer 354 is enabled for supply as the immediateThreshMet signal. When immediateBytes is less than immedLengthValue, clipped is inactive, and the output of comparator 352 is supplied as immediateThreshMet. When immediateBytes exceeds the immedLengthValue, then the value of immediateBytes is disregarded, and the immedCrossedThresh comparator 353 takes over.

The assertion of queueStatusRead clears the counter, ensuring that it is always properly synchronized with the writing of a new frame descriptor to transmit area.

The data available control module 323 consists of a four-state state machine illustrated in FIG. 17. The four states include an INIT2 state 370, an IMMEDIATE_THRESH_MET state 371, a DOWNLOAD_THRESH _MET state 372, and a FRAME_RESIDENT state 373. The INIT2 state 370 is entered upon downloadDmaReset. If the zeroFramesResident, and zeroDownloadsPending, and immediateThreshMet signals are true, then the IMMEDIATE_THRESH_MET state 371 is entered. In this state, the xmitDataAvailable signal is asserted. The IMMEDIATE_THRESH_MET state returns to the INIT2 state 370 upon the assertion of queueError. Alternatively, when the zeroDownloadsPending signal is deasserted and the queueError signal is not asserted, then the control proceeds from the IMMEDIATE_THRESH_MET state 371 to the DOWNLOAD_THRESH_MET state 372. During this state, the xmitDataAvailable signal is true. If the zeroFramesResident signal is not true, then the state machine proceeds to the FRAME_RESIDENT state 373 from the DOWNLOAD_THRESH_MET state 372. In this state, the xmitDataAvailable signal remains asserted. Upon assertion of zeroFramesResident, the state machine returns to the INIT2 state 370 where xmitDataAvailable is false.

Alternatively, from the INIT2 state 370, if the zeroFramesResident signal is deasserted, then the state machine proceeds directly to the FRAME_RESIDENT state 373. Also, in the event that the zeroFramesResident signal is true, the zeroDownloadsPending signal is false, and the downloadThreshMet signal is true, then the state machine proceeds from the INIT2 state 370 to the DOWNLOAD_THRESH_MET state 372. The state machine prevents transitions on the data available control input variables (downloadThreshMet, immediateThreshMet, zeroDownloadsPending, zeroFramesResident) from causing spurious indications on the xmitDataAvailable control line.

VII. Underrun Control Logic

Figure 18:
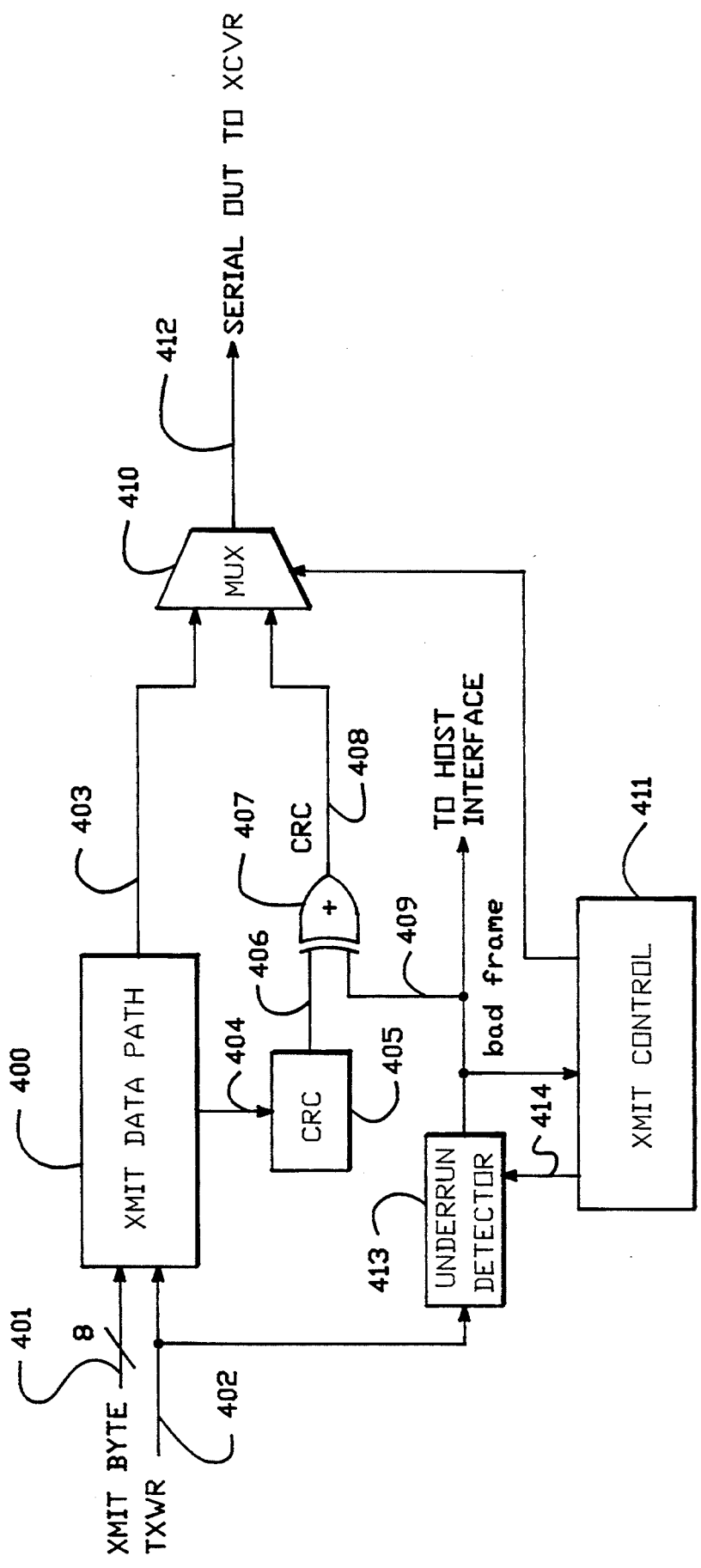
FIG. 18 is a simplified block diagram of the transmit logic according to the present invention.

The transmit logic 39 of FIG. 2 includes underrun control logic coupled to the data path as shown in the simplified block diagram of FIG. 18. In FIG. 18, the transmit data path 400 is illustrated receiving transmit bytes across line 401 from the transmit DMA logic. Also, a transmit write signal TXWR is supplied on line 402 to the transmit data path 40. The transmit data path receives the transmit bytes across line 401 and serializes them for supply on output line 403. Also, data from the frame is supplied across line 404 to CRC logic 405 for generating error detection codes to be appended to the end of frames according to standard media access control functions. The output of the CRC logic 405 is supplied on line 406 to an exclusive OR gate 407. Exclusive OR gate 407 passes the CRC code through to line 408 unless a bad frame signal on line 409 is asserted.

The data on line 403 and the CRC on line 408 are supplied to a multiplexer 410 which is controlled by transmit control logic 411 to supply the data of the frame followed by the CRC of the frame for valid frames to the serial output line 412. Line 412 is then coupled to a transceiver for transmission on the network.

According to the present invention, this transmit data path includes an underrun detector 413 for detecting a condition in which the transferring of data into the transmit data buffer, or immediate data to the transmit descriptor buffer, by the host interface falls behind the transferring of data into the transmit data path 400 by the transmit DMA logic. The underrun detector 413 is controlled by the transmit control logic 411. The transmit control logic 411 indicates intervals across line 414 during which a transmit write TXWR signal is expected on line 402. The underrun detector determines that a transmit write TXWR signal is not present during an expected interval of the frame transmission, then a bad frame signal is generated on line 409. In response to the bad frame signal, the CRC data is inverted by the exclusive OR gate 407 which causes a bad CRC to be generated for the already transmitted portions of the frame suffering the underrun. Transmit control logic 411 also responds to the bad frame signal on line 409 to select the bad CRC data through multiplexer 410. Finally, the bad frame signal on line 409 is used for posting status information through the xmitFailureRegister of an underrun condition.

VIII. Conclusion

Thus, the present invention allows for early transmission start in the system described above. By loading the XMIT START THRESH register, the system is enabled to begin transmission of a frame onto the network media prior to transfer of the entire frame into the adapter's buffer. The early transmission start is enabled by setting the XMIT START THRESH register to a non-zero value.

XMIT START THRESH is used to specify the number of bytes of the transmit frame that must reside on the adapter, either as immediate data or as data transferred onto the adapter via bus master data transfers, or as a combination of the two, before the adapter can commence with the media access control functions associated with transmitting the frame.

If the number of immediate data bytes expected by the adapter (as determined by the value written to the XMIT IMMEDIATE LENGTH field of the XMIT AREA) exceeds the value set in XMIT START THRESH, then the adapter will begin transmitting the frame immediately after sufficient writes to the XMIT AREA have occurred. Otherwise, the start of transmission will be delayed until, as a bus master, the adapter has downloaded enough data into its onboard buffer to satisfy the early transmit start threshold requirement. If, however, the threshold value is greater than or equal to the frame length, then transmission will commence once the entire frame is resident on the adapter. Of course, the start of the transmission may be delayed by other queued transmission, or by deferral to network traffic.

If this register set to zero, then the early transmit feature is disabled and the entire transmit frame must reside on the adapter before the adapter will begin to transmit it.

The value for this register may be programmed by the host to optimize performance. If set too low, system latencies or bandwidth limitations may cause the adapter to underrun the network during transmission, causing a partial frame with a guaranteed bad CRC to be transmitted. If the value is set too high, then unnecessary delays will be incurred before the start of transmission. The adapter generates an indication of an underrun condition which is made available to the host through the XMIT FAILURE register. If such an underrun indication occurs, then the host driver should increase the value on the XMIT START THRESH register. Further underrun indications should cause the driver to continually increase the XMIT START THRESH value. If the XMIT START THRESH value is increased to a value of greater than the maximum length expected by the system, then the early transmit start features should be disabled by writing a zero to the XMIT START THRESH register.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. For a system transmitting frames of data across a communications medium; an apparatus comprising:
   buffer memory for storing data of frames composed by the host computer for transmission on the communications medium;
   means, having a host system interface, for transferring data of frames to the buffer memory;
   means, coupled with the buffer memory, for monitoring the transferring of data of a frame to the buffer memory to make a threshold determination of an amount of data of the frame transferred to the buffer memory;
   means, responsive to the threshold determination of the means for monitoring, for initiating transmission of the frame prior to transfer of all the data of the frame to the buffer memory from the host computer;
   transmit logic, responsive to the means for initiating transmission, for retrieving data from the buffer memory and supplying retrieved data for transmission on the communications medium; and
   underrun control logic, which detects a condition in which the means for transferring falls behind the transmit logic, and supplies a bad frame signal to the communications medium in response to the underrun condition.

2. The apparatus of claim 1, wherein the transmit buffer includes a transmit descriptor ring buffer and a transmit data buffer, the transmit descriptors including data identifying data to be transmitted on the communications medium and optionally immediate data, and wherein the means for monitoring includes the immediate data in the threshold determination.

3. The apparatus of claim 1, wherein the buffer memory comprises a buffer independent of the host address space.

4. The apparatus of claim 1, wherein the transmit logic includes means for appending an error detection code to transmitted frames, and the bad frame signal comprises a corrupted error detection code.

5. The apparatus of claim 1, wherein the means for monitoring includes a threshold store alterable by the system for storing a threshold value, and logic responsive to the threshold value for making the threshold determination.

6. The apparatus of claim 5, wherein the frames have an identifiable beginning and the threshold value specifies an amount of data from the beginning of the frame.

7. The apparatus of claim 1, wherein the buffer includes a transmit descriptor ring buffer and a transmit data buffer, and the means for transferring includes:
   transmit descriptor logic for mapping transmit descriptors from the system to the transmit descriptor ring buffer; and
   download logic, responsive to transmit descriptors in the transmit descriptor ring buffer, for retrieving data from memory in the system and storing retrieved data in the transmit data buffer.

8. The apparatus of claim 7, wherein the transmit descriptors further include immediate data to be transmitted on the communications medium, and wherein the means for monitoring includes the immediate data in the threshold determination.

9. The apparatus of claim 8, the transmit logic further including:

logic, responsive to transmit descriptors in the transmit ring buffer and the means for initiating transmission, for retrieving data from the transmit descriptor ring buffer and transmit data buffer and supplying retrieved data for transmission on the communications medium.

10. An apparatus for controlling communication between a host system and a network transceiver coupled with a network, comprising:

a buffer memory;

host interface means, having an interface to the host system, for transferring data between the host system and the buffer memory;

means, coupled with the buffer memory and including a host system alterable threshold store for storing a threshold value, for monitoring the transferring of data of a frame to the buffer memory to make a threshold determination of an amount of data of the frame transferred to the buffer memory; and means, responsive to the threshold determination of the means for monitoring, for initiating transmission of the frame, prior to transfer of all the data of the frame to the buffer memory from the host computer;

network interface means, having an interface to the network transceiver and responsive to the means for initiating, for transferring data between the buffer memory and the network transceiver for transmission; and control means, coupled with the network interface means, for posting status information for use by the host system, as feedback for optimizing the threshold value.

11. The apparatus of claim 10, wherein the host interface means includes:

transmit descriptor logic for transferring transmit descriptors identifying data to be transmitted from the host system to the buffer memory; and download logic, responsive to transmit descriptors in the buffer memory, for retrieving data from memory in the host system and storing retrieved data in the buffer memory.

12. The apparatus of claim 11, wherein the transmit descriptors include immediate data.

13. The apparatus of claim 12, wherein the means for monitoring includes logic for determining amounts of immediate data in transmit descriptors.

14. The apparatus of claim 12, wherein the means for monitoring includes logic for determining an amount of immediate data in a transmit descriptor and an amount of data retrieved by the download logic in response to the transmit descriptor in making the threshold determination.

15. The apparatus of claim 10, wherein the control means further includes:

underrun control logic, which detects an underrun condition in which the host interface means in transferring data to the buffer memory falls behind the network interface means in transferring data to the transceiver, and means for supplying a bad frame signal to the communication media in response to the underrun condition.

16. The apparatus of claim 15, wherein the control means includes means for appending an error detection code to transmitted frames, and the bad frame signal comprises a corrupted error detection code.

17. The apparatus of claim 15, wherein the status information posted by the control means includes an indication of an underrun condition.

18. An apparatus for controlling communication between a host system and a network transceiver coupled with a network, comprising:

a buffer memory, including a transmit descriptor buffer for storing transmit descriptors identifying data in the host system to be transmitted and including immediate data, and a transmit data buffer for buffering data of frames transferred from the host system;

host interface means, having an interface to the host system, for transferring transmit descriptors and data of frames between the host system and the buffer memory and including means, responsive to transmit descriptors in the transmit descriptor buffer, for downloading data of frames from the host system to the transmit data buffer;

means, coupled with the buffer memory, for monitoring the immediate data in transmit descriptors in the transmit descriptor buffer and the downloading of data of a frame to the transmit data buffer to make a threshold determination of an amount of data of the frame transferred to the buffer memory; and means, responsive to the threshold determination of the means for monitoring, for initiating transmission of the frame, prior to transfer of all the data of the frame to the buffer memory from the host computer;

network interface means, having an interface to the network transceiver and responsive to the means for initiating, for transferring data between the buffer memory and the network transceiver for transmission; and underrun control means, coupled with the network interface means, for detecting an underrun condition in which the host interface means in downloading data to the transmit data buffer falls behind the network interface means in transferring data to the transceiver, and for supplying a bad frame signal to the network transceiver in response to the underrun condition.

19. The apparatus of claim 18, wherein the means for monitoring includes a threshold store alterable by the system for storing a threshold value, and logic responsive to the threshold value for making the threshold determination; and the underrun control means includes means for posting status information which may be used by the host system as feedback for optimizing the threshold value.

20. The apparatus of claim 18, wherein the network interface means includes means for appending an error detection code to transmitted frames, and the bad frame signal comprises a corrupted error detection code.

21. A network interface adapter for a carrier sense, multiple access network with collision detection (CSMA/CD), comprising:

buffer memory which stores data of frames composed by a host computer for transmission on the network;

data transfer circuitry, having a host system interface, for transferring data of frames to the buffer memory;

logic, coupled to the buffer memory, which monitors the transferring of data of a frame to the buffer memory to make a threshold determination of an amount of data of the frame transferred to the buffer memory;

a medium access controller for the CSMA/CD network coupled to the buffer memory for managing transmission of frames of data from the buffer memory to the network; and logic, responsive to the threshold determination of the logic which monitors the transferring of data to the buffer memory, which initiates transmission of the frame from the buffer memory to the medium access controller prior to transfer of all of the data of the frame to the buffer memory, including logic which initiates transmission of the frame when no complete frame of data is present in the buffer memory.

22. The adapter of claim of 21, wherein the buffer memory includes a transmit descriptor ring buffer and a transmit data buffer, the transmit descriptors including data identifying data to be transmitted on the network and optionally immediate data, and wherein the threshold logic includes the immediate data in the threshold determination.

23. The adapter of claim 21, wherein the threshold logic includes an alterable threshold store which stores the threshold value, and logic responsive to the threshold value for making the threshold determination.

24. The adapter of claim 23, wherein the frames have an identifiable beginning and the threshold value specifies an amount of data from the beginning of the frame.

25. The adapter of claim 21, further including:
underrun control logic, which detects a condition in which the data transfer circuitry falls behind the medium access controller, and supplies a bad frame signal to the network in response to the underrun condition.

26. The apparatus of claim 25, wherein the medium access controller includes logic which appends an error detection code to the transmitted frames, and a bad frame signal generated by the underrun control logic comprises a corrupted error detection code.

* * * * *